United States Patent
Duparre et al.

(10) Patent No.: US 9,100,635 B2
(45) Date of Patent: Aug. 4, 2015

(54) SYSTEMS AND METHODS FOR DETECTING DEFECTIVE CAMERA ARRAYS AND OPTIC ARRAYS

(71) Applicant: Pelican Imaging Corporation, Santa Clara, CA (US)

(72) Inventors: Jacques Duparre, Jena (DE); Andrew Kenneth John McMahon, San Carlos, CA (US); Dan Lelescu, Morgan Hill, CA (US); Kartik Venkataraman, San Jose, CA (US); Gabriel Molina, Sunnyvale, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 0 days.

(21) Appl. No.: 13/931,724

(22) Filed: Jun. 28, 2013

(65) Prior Publication Data

US 2014/0002675 A1   Jan. 2, 2014

Related U.S. Application Data

(60) Provisional application No. 61/665,724, filed on Jun. 28, 2012.

(51) Int. Cl.
*H04N 9/64* (2006.01)
*H04N 15/00* (2006.01)
(Continued)

(52) U.S. Cl.
CPC ........... *H04N 17/002* (2013.01); *H04N 5/2254* (2013.01); *H04N 5/367* (2013.01)

(58) Field of Classification Search
CPC .......... H04N 13/0239; H04N 13/0246; H04N 5/2258; H04N 13/0055; H04N 13/0225; H04N 17/002; H04N 5/2254; H04N 5/367; G06T 2207/10021; G06T 7/002; G06T 7/0075; G06K 9/209; G06K 9/32
USPC ........................ 348/42–60, 246, 247; 382/154
See application file for complete search history.

(56) References Cited

U.S. PATENT DOCUMENTS

| | | | |
|---|---|---|---|
| 4,124,798 | A | 11/1978 | Thompson |
| 4,198,646 | A | 4/1980 | Alexander et al. |

(Continued)

FOREIGN PATENT DOCUMENTS

| | | | |
|---|---|---|---|
| EP | 840502 | A2 | 5/1998 |
| EP | 1201407 | A2 | 5/2002 |

(Continued)

OTHER PUBLICATIONS

International Search Report and Written Opinion for International Application No. PCT/US13/48772, International Filing Date Jun. 28, 2013, Search Completed Oct. 21, 2013, Mailed Nov. 8, 2013, 11 pgs.

(Continued)

*Primary Examiner* — Chia-Wei A Chen
(74) *Attorney, Agent, or Firm* — KPPB LLP

(57) ABSTRACT

Systems and methods for detecting defective camera arrays, optic arrays and/or sensors are described. One embodiment includes capturing image data using a camera array; dividing the captured images into a plurality of corresponding image regions; identifying the presence of localized defects in any of the cameras by evaluating the image regions in the captured images; and detecting a defective camera array using the image processing system when the number of localized defects in a specific set of image regions exceeds a predetermined threshold, where the specific set of image regions is formed by: a common corresponding image region from at least a subset of the captured images; and any additional image region in a given image that contains at least one pixel located within a predetermined maximum parallax shift distance along an epipolar line from a pixel within said common corresponding image region within the given image.

14 Claims, 15 Drawing Sheets

(51) Int. Cl.
*H04N 13/00* (2006.01)
*H04N 13/02* (2006.01)
*G06K 9/00* (2006.01)
*H04N 17/00* (2006.01)
*H04N 5/225* (2006.01)
*H04N 5/367* (2011.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 5,005,083 A | 4/1991 | Grage |
| 5,327,125 A | 7/1994 | Iwase et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A * | 12/2000 | Melen .............. 382/154 |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 * | 3/2001 | Melen .............. 382/154 |
| 6,239,909 B1 | 5/2001 | Hayashi et al. |
| 6,358,862 B1 | 3/2002 | Ireland et al. |
| 6,476,805 B1 | 11/2002 | Shum et al. |
| 6,477,260 B1 | 11/2002 | Shimomura |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,958,862 B1 | 10/2005 | Joseph |
| 7,085,409 B2 | 8/2006 | Sawhney et al. |
| 7,161,614 B1 | 1/2007 | Yamashita et al. |
| 7,199,348 B2 * | 4/2007 | Olsen et al. ........ 250/208.1 |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 * | 3/2011 | Hebert et al. ................ 702/153 |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 * | 4/2012 | Zhang ........................ 348/155 |
| 8,180,145 B2 | 5/2012 | Wu et al. |
| 8,189,065 B2 | 5/2012 | Georgiev et al. |
| 8,189,089 B1 * | 5/2012 | Georgiev et al. ............. 348/343 |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,290,358 B1 | 10/2012 | Georgiev |
| 8,305,456 B1 | 11/2012 | McMahon |
| 8,315,476 B1 | 11/2012 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,446,492 B2 | 5/2013 | Nakano et al. |
| 8,514,491 B2 | 8/2013 | Duparre |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,581,995 B2 | 11/2013 | Lin et al. |
| 8,619,082 B1 | 12/2013 | Ciurea et al. |
| 8,655,052 B2 | 2/2014 | Spooner et al. |
| 8,682,107 B2 | 3/2014 | Yoon et al. |
| 8,692,893 B2 | 4/2014 | McMahon |
| 8,773,536 B1 * | 7/2014 | Zhang ........................ 348/155 |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 9,025,894 B2 | 5/2015 | Venkataraman et al. |
| 9,025,895 B2 | 5/2015 | Venkataraman et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 2001/0005225 A1 | 6/2001 | Clark et al. |
| 2001/0019621 A1 | 9/2001 | Hanna et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0113867 A1 | 8/2002 | Takigawa et al. |
| 2002/0113888 A1 | 8/2002 | Sonoda et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |

(56) References Cited

U.S. PATENT DOCUMENTS

| | | |
|---|---|---|
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0066454 A1 | 4/2004 | Otani et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1* | 11/2004 | Blake et al. ................. 382/154 |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1* | 6/2005 | Gruhlke et al. ............... 348/272 |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296835 A1 | 12/2007 | Olsen et al. |
| 2007/0296847 A1 | 12/2007 | Chang et al. |
| 2008/0019611 A1 | 1/2008 | Larkin |
| 2008/0025649 A1 | 1/2008 | Liu et al. |
| 2008/0030597 A1* | 2/2008 | Olsen et al. ................. 348/227.1 |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0151097 A1 | 6/2008 | Chen et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1* | 11/2008 | Yuan et al. ................... 382/103 |
| 2008/0278591 A1 | 11/2008 | Barna et al. |
| 2008/0298674 A1* | 12/2008 | Baker et al. .................. 382/154 |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0140131 A1 | 6/2009 | Utagawa et al. |
| 2009/0152664 A1 | 6/2009 | Klem et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |

(56) References Cited

U.S. PATENT DOCUMENTS

| | | |
|---|---|---|
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1* | 5/2010 | Coffman ........................ 382/285 |
| 2010/0118127 A1 | 5/2010 | Nam et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0309292 A1 | 12/2010 | Ho et al. |
| 2011/0018973 A1* | 1/2011 | Takayama ........................ 348/47 |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1* | 6/2011 | Nakajima et al. ............... 348/50 |
| 2011/0176020 A1 | 7/2011 | Chang |
| 2011/0211824 A1 | 9/2011 | Georgiev et al. |
| 2011/0221599 A1 | 9/2011 | Hö gasten |
| 2011/0221658 A1 | 9/2011 | Haddick et al. |
| 2011/0221939 A1 | 9/2011 | Jerdev |
| 2011/0234841 A1 | 9/2011 | Akeley et al. |
| 2011/0241234 A1 | 10/2011 | Duparre |
| 2011/0255592 A1 | 10/2011 | Sung et al. |
| 2011/0255745 A1 | 10/2011 | Hodder et al. |
| 2011/0267348 A1 | 11/2011 | Lin et al. |
| 2011/0273531 A1 | 11/2011 | Ito et al. |
| 2011/0279721 A1 | 11/2011 | McMahon |
| 2011/0285866 A1 | 11/2011 | Bhrugumalla et al. |
| 2011/0298917 A1* | 12/2011 | Yanagita ........................ 348/135 |
| 2011/0300929 A1 | 12/2011 | Tardif et al. |
| 2011/0310980 A1 | 12/2011 | Mathew |
| 2012/0012748 A1 | 1/2012 | Pain et al. |
| 2012/0026297 A1* | 2/2012 | Sato ........................ 348/47 |
| 2012/0026342 A1 | 2/2012 | Yu et al. |
| 2012/0044249 A1 | 2/2012 | Mashitani et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1* | 6/2012 | Li et al. ........................ 348/43 |
| 2012/0147205 A1 | 6/2012 | Lelescu et al. |
| 2012/0153153 A1 | 6/2012 | Chang et al. |
| 2012/0154551 A1* | 6/2012 | Inoue ........................ 348/49 |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0229628 A1* | 9/2012 | Ishiyama et al. ............... 348/135 |
| 2012/0249550 A1* | 10/2012 | Akeley et al. ................. 345/419 |
| 2012/0262607 A1* | 10/2012 | Shimura et al. ............... 348/239 |
| 2012/0287291 A1 | 11/2012 | McMahon |
| 2012/0314033 A1 | 12/2012 | Lee et al. |
| 2012/0327222 A1 | 12/2012 | Ng et al. |
| 2013/0002828 A1* | 1/2013 | Ding et al. ........................ 348/49 |
| 2013/0003184 A1 | 1/2013 | Duparre |
| 2013/0010073 A1 | 1/2013 | Do |
| 2013/0050504 A1 | 2/2013 | Safaee-Rad et al. |
| 2013/0050526 A1 | 2/2013 | Keelan |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1* | 5/2013 | Morohoshi et al. ............. 348/51 |
| 2013/0128121 A1* | 5/2013 | Agarwala et al. ............. 348/607 |
| 2013/0147979 A1 | 6/2013 | McMahon |
| 2013/0215108 A1 | 8/2013 | McMahon et al. |
| 2013/0222556 A1* | 8/2013 | Shimada ........................ 348/50 |
| 2013/0223759 A1 | 8/2013 | Nishiyama et al. |
| 2013/0229540 A1 | 9/2013 | Farina et al. |
| 2013/0259317 A1 | 10/2013 | Gaddy |
| 2013/0265459 A1 | 10/2013 | Duparre et al. |
| 2013/0293760 A1 | 11/2013 | Nisenzon et al. |
| 2014/0009586 A1* | 1/2014 | McNamer et al. ............. 348/50 |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0176592 A1 | 6/2014 | Wilburn et al. |
| 2014/0192253 A1 | 7/2014 | Laroia |
| 2014/0198188 A1* | 7/2014 | Izawa ........................ 348/49 |
| 2014/0218546 A1 | 8/2014 | Mcmahon |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0285675 A1 | 9/2014 | Mullis |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |

(56) References Cited

U.S. PATENT DOCUMENTS

| | | | |
|---|---|---|---|
| 2015/0009354 | A1 | 1/2015 | Venkataraman et al. |
| 2015/0009362 | A1 | 1/2015 | Venkataraman et al. |
| 2015/0015669 | A1 | 1/2015 | Venkataraman et al. |
| 2015/0035992 | A1 | 2/2015 | Mullis |
| 2015/0042766 | A1 | 2/2015 | Ciurea et al. |
| 2015/0042767 | A1 | 2/2015 | Ciurea et al. |
| 2015/0049915 | A1 | 2/2015 | Ciurea et al. |
| 2015/0049916 | A1 | 2/2015 | Ciurea et al. |
| 2015/0049917 | A1 | 2/2015 | Ciurea et al. |
| 2015/0055884 | A1 | 2/2015 | Venkataraman et al. |
| 2015/0122411 | A1 | 5/2015 | Rodda et al. |
| 2015/0124113 | A1 | 5/2015 | Rodda et al. |
| 2015/0124151 | A1 | 5/2015 | Rodda et al. |

FOREIGN PATENT DOCUMENTS

| | | | |
|---|---|---|---|
| EP | 2336816 | A2 | 6/2011 |
| JP | 11142609 | A | 5/1999 |
| JP | 11223708 | A | 8/1999 |
| JP | 2002205310 | A | 7/2002 |
| JP | 2003094445 | A | 4/2003 |
| JP | 2005116022 | A | 4/2005 |
| JP | 2005181460 | A | 7/2005 |
| JP | 2006033493 | A | 2/2006 |
| JP | 2006047944 | A | 2/2006 |
| JP | 2006258930 | A | 9/2006 |
| JP | 2007520107 | A | 7/2007 |
| JP | 2008055908 | A | 3/2008 |
| JP | 2009132010 | A | 6/2009 |
| JP | 2011109484 | A | 6/2011 |
| JP | 2014521117 | A | 8/2014 |
| KR | 1020110097647 | A | 8/2011 |
| WO | 2007083579 | A1 | 7/2007 |
| WO | 2008108271 | A1 | 9/2008 |
| WO | 2009151903 | A2 | 12/2009 |
| WO | 2011055655 | A1 | 5/2011 |
| WO | 2011063347 | A2 | 5/2011 |
| WO | 2011116203 | A1 | 9/2011 |
| WO | 2011063347 | A3 | 10/2011 |
| WO | 2011143501 | A1 | 11/2011 |
| WO | 2012057619 | A1 | 5/2012 |
| WO | 2012057620 | A2 | 5/2012 |
| WO | 2012057621 | A1 | 5/2012 |
| WO | 2012057622 | A1 | 5/2012 |
| WO | 2012057623 | A1 | 5/2012 |
| WO | 2012057620 | A3 | 6/2012 |
| WO | 2012074361 | A1 | 6/2012 |
| WO | 2012082904 | A1 | 6/2012 |
| WO | 2013003276 | A1 | 1/2013 |
| WO | 2013043751 | A1 | 3/2013 |
| WO | 2013043761 | A1 | 3/2013 |
| WO | 2013049699 | A1 | 4/2013 |
| WO | 2013055960 | A1 | 4/2013 |
| WO | 2013119706 | A1 | 8/2013 |
| WO | 2013126578 | A1 | 8/2013 |
| WO | 2014052974 | A2 | 4/2014 |
| WO | 2014032020 | A3 | 5/2014 |
| WO | 2014078443 | A1 | 5/2014 |
| WO | 2014133974 | A1 | 9/2014 |
| WO | 2014138695 | A1 | 9/2014 |
| WO | 2014138697 | A1 | 9/2014 |
| WO | 2014144157 | A1 | 9/2014 |
| WO | 2014145856 | A1 | 9/2014 |
| WO | 2014149403 | A1 | 9/2014 |
| WO | 2014150856 | A1 | 9/2014 |
| WO | 2014159779 | A1 | 10/2014 |
| WO | 2014160142 | A1 | 10/2014 |
| WO | 2014164550 | A2 | 10/2014 |
| WO | 2014164909 | A1 | 10/2014 |
| WO | 2014133974 | A9 | 4/2015 |

OTHER PUBLICATIONS

International Search Report and Written Opinion for International Application No. PCT/US13/46002, Search Completed Nov. 13, 2013, Mailed Nov. 29, 2013, 7 pgs.

International Search Report and Written Opinion for International Application No. PCT/US13/56065, Search Completed Nov. 25, 2013, Mailed Nov. 26, 2013, 8 pgs.

International Search Report and Written Opinion for International Application No. PCT/US13/59991, Search Completed Feb. 6, 2014, Mailed Feb. 26, 2014, 8 pgs.

International Search Report and Written Opinion for International Application No. PCT/US2013/024987, Search Completed Mar. 27, 2013, Mailed Apr. 15, 2013, 14 pgs.

International Search Report and Written Opinion for International Application No. PCT/US2013/056502, Search Completed Feb. 18, 2014, Mailed Mar. 19, 2014, 7 pgs.

International Search Report and Written Opinion for International Application No. PCT/US2013/069932, Search Completed Mar. 14, 2014, Mailed Apr. 14, 2014, 12 pgs.

IPRP for International Application No. PCT/US2012/059813, International Filing Date Oct. 11, 2012, Search Completed Apr. 15, 2014, 7 pgs.

Search Report and Written Opinion for International Application PCT/US11/36349, mailed Aug. 22, 2011, 12 pgs.

International Search Report and Written Opinion for International Application No. PCT/US2013/027146, completed Apr. 2, 2013, 12 pgs.

International Search Report and Written Opinion for International Application PCT/US2012/044014, completed Oct. 12, 2012, 15 pgs.

International Search Report and Written Opinion for International Application PCT/US2012/059813, completed Dec. 17, 2012, 8 pgs.

International Search Report and Written Opinion for International Application PCT/US12/37670, Mailed Jul. 18, 2012, Search Completed Jul. 5, 2012, 9 pgs.

International Search Report and Written Opinion for International Application PCT/US2012/58093, completed Nov. 15, 2012, 12 pgs.

Bishop et al., "Full-Resolution Depth Map Estimation from an Aliased Plenoptic Light Field", ACCV 2010, Part II, LNCS 6493, pp. 185-200.

Bishop et al., "Light Field Superresolution", Retrieved from http://home.eps.hw.ac.uk/~sz73/ICCP09/LightFieldSuperresolution.pdf, 9 pgs.

Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.

Hamilton, "JPEG File Interchange Format, Version 1.02", Sep. 1, 1992, 9 pgs.

Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.

Muehlebach, "Camera Auto Exposure Control for VSLAM Applications", Studies on Mechatronics.

Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.

Vuong et al., "A New Auto Exposure and Auto White-Balance Algorithm to Detect High Dynamic Range Conditions Using CMOS Technology".

International Search Report and Written Opinion for International Application No. PCT/US2011/64921, International Filing Date Dec. 14, 2011, Report Completed Feb. 25, 2011, mailed Mar. 6, 2012, 17 pgs.

International Search Report and Written Opinion for International Application PCT/US2012/056151, completed Nov. 14, 2012, 10 pgs.

International Search Report and Written Opinion for International Application No. PCT/US2009/044687, date completed Jan. 5, 2010, date mailed Jan. 13, 2010, 9 pgs.

International Search Report and Written Opinion for International Application PCT/US2010/057661, completed Mar. 9, 2011, 14 pgs.

Office Action for U.S. Appl. No. 12/952,106, dated Aug. 16, 2012, 12 pgs.

Baker et al., "Limits on Super-Resolution and How to Break Them", IEEE Transactions on Pattern Analysis and Machine Intelligence, Sep. 2002, vol. 24, No. 9, pp. 1167-1183.

(56) References Cited

OTHER PUBLICATIONS

Bertero et al., "Super-resolution in computational imaging", Micron, 2003, vol. 34, Issues 6-7, 17 pgs.

Borman, "Topics in Multiframe Superresolution Restoration", Thesis of Sean Borman, Apr. 2004, 282 pgs.

Borman et al, "Image Sequence Processing", Source unknown, Oct. 14, 2002, 81 pgs.

Borman et al., "Block-Matching Sub-Pixel Motion Estimation from Noisy, Under-Sampled Frames—An Empirical Performance Evaluation", Proc SPIE, Dec. 1998, 3653, 10 pgs.

Borman et al., "Image Resampling and Constraint Formulation for Multi-Frame Super-Resolution Restoration", Proc. SPIE, Jun. 2003, 5016, 12 pgs.

Borman et al., "Linear models for multi-frame super-resolution restoration under non-affine registration and spatially varying PSF", Proc. SPIE, May 2004, vol. 5299, 12 pgs.

Borman et al., "Nonlinear Prediction Methods for Estimation of Clique Weighting Parameters in NonGaussian Image Models", Proc. SPIE, 1998. 3459, 9 pgs.

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

Borman et al., "Super-Resolution from Image Sequences—A Review", Circuits & Systems, 1998, pp. 374-378.

Bose et al., "Superresolution and Noise Filtering Using Moving Least Squares", IEEE Transactions on Image Processing, date unknown, 21 pgs.

Boye et al., "Comparison of Subpixel Image Registration Algorithms", Proc. Of SPIE-IS&T Electronic Imaging, vol. 7246, pp. 72460X-1-72460X-9.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, 2010, 11 pgs.

Bruckner et al., "Thin wafer-level camera lenses inspired by insect compound eyes", Optics Express, Nov. 22, 2010, vol. 18, No. 24, pp. 24379-24394.

Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages), 2001.

Chan et al., "Extending the Depth of Field in a Compound-Eye Imaging System with Super-Resolution Reconstruction", Proceedings—International Conference on Pattern Recognition, 2006, vol. 3, pp. 623-626.

Chan et al., "Investigation of Computational Compound-Eye Imaging System with Super-Resolution Reconstruction", IEEE, ISASSP 2006, pp. 1177-1180.

Chan et al., "Super-resolution reconstruction in a computational compound-eye imaging system", Multidim. Syst. Sign Process, 2007, vol. 18, pp. 83-101.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, 2008, vol. 3, pp. 1-6.

Duparre et al., "Artificial compound eyes—different concepts and their application to ultra flat image acquisition sensors", MOEMS and Miniaturized Systems IV, Proc. SPIE 5346, Jan. 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, 2006, vol. 1, pp. R1-R16.

Duparre et al., "Microoptical artificial compound eyes—from design to experimental verification of two different concepts", Proc. of SPIE, Optical Design and Engineering II, vol. 5962, pp. 59622A-1-59622A-12.

Duparre et al., "Microoptical Artificial Compound Eyes—Two Different Concepts for Compact Imaging Systems", 11th Microoptics Conference, Oct. 30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 3005, vol. 44, No. 15, pp. 2949-2956.

Duparre et al., "Ultra-Thin Camera Based on Artificial Apposistion Compound Eyes", 10th Microoptics Conference, Sep. 1-3, 2004, 2 pgs.

Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.

Farrell et al., "Resolution and Light Sensitivity Tradeoff with Pixel Size", Proceedings of the SPIE Electronic Imaging 2006 Conference, 2006, vol. 6069, 8 pgs.

Farsiu et al., "Advances and Challenges in Super-Resolution", International Journal of Imaging Systems and Technology, 2004, vol. 14, pp. 47-57.

Farsiu et al., "Fast and Robust Multiframe Super Resolution", IEEE Transactions on Image Processing, Oct. 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, pp. 141-159.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., Optical System Design, 2nd Edition, SPIE Press191-198.

Fischer et al., Optical System Design, 2nd Edition, SPIE Press49-58.

Hardie, A Fast Image Super-Algorithm Using an Adaptive Wiener Filter, IEEE Transactions on Image Processing, Dec. 2007, vol. 16, No. 12, pp. 2953-2964.

Horisaki et al., "Irregular Lens Arrangement Design to Improve Imaging Performance of Compound-Eye Imaging Systems", Applied Physics Express, 2010, vol. 3, pp. 022501-1-022501-3.

Horisaki et al., "Superposition Imaging for Three-Dimensionally Space-Invariant Point Spread Functions", Applied Physics Express, 2011, vol. 4, pp. 112501-1-112501-3.

Kang et al., "Handling Occlusions inn Dense Multi-View Stereo", Computer Vision and Pattern Recognition, 2001, vol. 1, pp. I-103-I-110.

(56) References Cited

OTHER PUBLICATIONS

Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 838-831.
Kutulakos et al., "Occluding Contour Detection Using Affine Invariants and Purposive Viewpoint Control", Proc., CVPR 94, 8 pgs.
Lensvector, "How LensVector Autofocus Works", http://www.lensvector.com/overview.html.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Liu et al., "Virtual View Reconstruction Using Temporal Information", 2012 IEEE International Conference on Multimedia and Expo, 2012, pp. 115-120.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander, et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sep.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Wang, "Calculation of Image Position, Size and Orientation Using First Order Properties".
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 6 Pgs.
Zhang, Qiang et al., "Depth estimation, spatially variant image registration, and super-resolution using a multi-lenslet camera", Proceedings of SPIE, vol. 7705, pp. 770505-770505-8, XP055113797 ISSN: 0277-786X, DOI: 10.1117/12.852171, Apr. 23, 2010.
International Preliminary Report on Patentability for International Application PCT/US2013/039155, report completed Nov. 4, 2014, Mailed Nov. 13, 2014, 10 Pgs.
International Preliminary Report on Patentability for International Application PCT/US2013/046002, Report completed Dec. 31, 2014, Mailed Jan. 8, 2015, 6 Pgs.
International Preliminary Report on Patentability for International Application PCT/US2013/048772, Report completed Dec. 31, 2014, Mailed Jan. 8, 2015, 8 Pgs.
International Search Report and Written Opinion for International Application PCT/US2013/062720, report completed Mar. 25, 2014, Mailed Apr. 21, 2014, 9 Pgs.
International Search Report and Written Opinion for International Application PCT/US2014/017766, report completed May 28, 2014, Mailed Jun. 18, 2014, 9 Pgs.
International Search Report and Written Opinion for International Application PCT/US2014/018084, Report completed May 23, 2014, Mailed Jun. 10, 2014, 12 pgs.

(56) References Cited

OTHER PUBLICATIONS

International Search Report and Written Opinion for International Application PCT/US2014/018116, report completed May 13, 2014, Mailed Jun. 2, 2014, 12 Pgs.
International Search Report and Written Opinion for International Application PCT/US2014/022118, report completed Jun. 9, 2014, Mailed, Jun. 25, 2014, 5 pgs.
International Search Report and Written Opinion for International Application PCT/US2014/024407, report completed Jun. 11, 2014, Mailed Jul. 8, 2014, 9 Pgs.
International Search Report and Written Opinion for International Application PCT/US2014/025100, report completed Jul. 7, 2014, Mailed Aug 7, 2014 5 Pgs.
International Search Report and Written Opinion for International Application PCT/US2014/025904 report completed Jun. 10, 2014, Mailed Jul. 10, 2014, 6 Pgs.
International Search Report and Written Opinion for International Application PCT/US2014/022123, report completed Jun. 9, 2014, Mailed Jun. 25, 2014, 5 pgs.
International Search Report and Written Opinion for International Application PCT/US2014/028447, report completed Jun. 30, 2014, Mailed Jul. 21, 2014, 8 Pgs.
International Search Report and Written Opinion for International Application PCT/US2014/030692, report completed Jul. 28, 2014, Mailed Aug. 27, 2014, 7 Pages.
International Search Report and Written Opinion for International Application PCT/US2014/023762, Report Completed May 30, 2014, Mailed Jul. 3, 2014, 6 Pgs.
Chen et al., "Interactive deformation of light fields", In Proceedings of SIGGRAPH I3D 2005, pp. 139-146, Apr. 2005.
Goldman et al., "Video Object Annotation, Navigation, and Composition", In Proceedings of UIST 2008, pp. 3-12, Oct. 2008.
Gortler et al., "The Lumigraph", In Proceedings of SIGGRAPH 1996, pp. 43-54, Aug. 1996.
Hacohen et al., "Non-Rigid Dense Correspondence with Applications for Image Enhancement", ACM Transactions on Graphics, 30, 4, 2011, pp. 70:1-70:10, Aug. 2011.
Hasinoff et al., "Search-and-Replace Editing for Personal Photo Collections", Computational Photography (ICCP) 2010, pp. 1-8, Aug. 2010.
Horn et al., "LightShop: Interactive Light Field Manipulation and Rendering", In Proceedings of I3D 2007, pp. 121-128 Apr. 2007.
Isaksen et al., "Dynamically Reparameterized Light Fields", In Proceedings of SIGGRAPH 2000, pp. 297-306, Jul. 2000.
Jarabo et al., "Efficient Propagation of Light Field Edits", In Proceedings of SIACG 2011, pp. 75-80, Jun. 2011.
Joshi et al., "Synthetic Aperture Tracking: Tracking Through Occlusions", I CCV IEEE 11th International Conference on Computer Vision; Oct. 2007,.Retrieved on Jul. 28, 2014 from: http:l/ieeexplore.ieee.org/stamp/stamp.jsp?tp=&arnumber=4409032&isnumber=4408819, pp. 1-8.
Lo et al., "Stereoscopic 3D Copy & Paste", ACM Transactions on Graphics, vol. 29, No. 6, Article 147, Dec. 2010, pp. 147:1-147:10.
Seitz et al., "Plenoptic Image Editing", International Journal of Computer Vision 48, 2, pp. 115-129, 1998, No month available.
Veilleux, "CCD Gain Lab: The Theory", University of Maryland, College Park-Observational Astronomy (ASTR 310), Oct. 19, 2006, retrieved on May 13, 2014 from http://www.astro.umd.edu/~veilleux/ASTR310/fall06/ccd_theory.pdf, 5 pgs.
International Search Report and Written Opinion for International Application No. PCT/US2013/039155, Search completed Jul. 1, 2013, Mailed Jul. 11, 2013, 11 Pgs.
International Search Report and Written Opinion for International Application No. PCT/US2014/064693, Report Completed Mar. 7, 2015, Mailed Apr. 2, 2015, 15 pgs.
International Preliminary Report on Patentability for International Application No. PCT/US2013/059991, Report Issued Mar. 17, 2015, Mailed Mar. 26, 2015, 8 pgs.
International Preliminary Report on Patentability for International Application No. PCT/US2013/062720, Report Issued Mar. 31, 2015, Mailed Apr. 9, 2015, 8 Pgs.
International Preliminary Report on Patentability for International Application No. PCT/US2014/023762, Report Issued Mar. 2, 2015, Mailed Mar. 9, 2015, 10 Pgs.
International Search Report and Written Opinion for International Application No. PCT/US2014/066229, Search Completed Mar. 6, 2015, Mailed Mar. 19, 2015, 9 Pgs.
International Preliminary Report on Patentability for International Application No. PCT/US2013/056065, Report Issued Feb. 24, 2015, Mailed Mar. 5, 2015, 4 Pgs.
International Preliminary Report on Patentability for International Application No. PCT/US2013/056502, Report Issued Feb. 24, 2015, Mailed Mar. 5, 2015, 7 Pgs.
US 8,957,977, 02/2015, Venkataraman et al. (withdrawn)
US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)

* cited by examiner

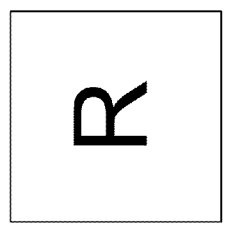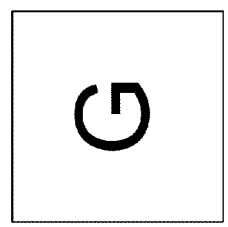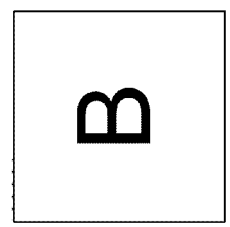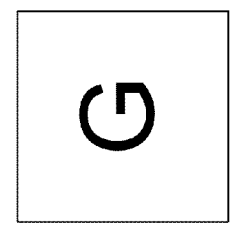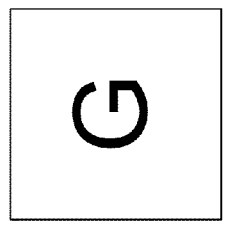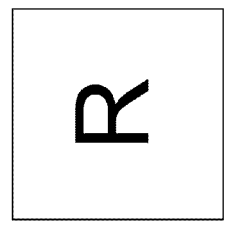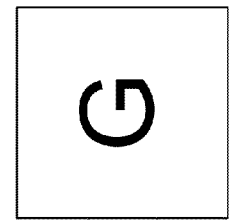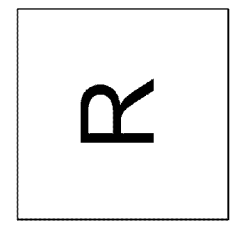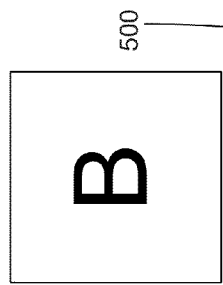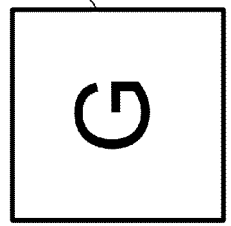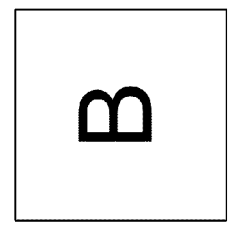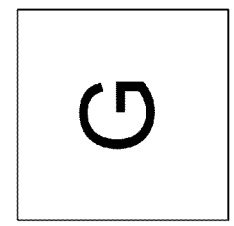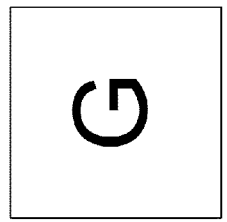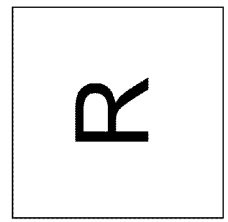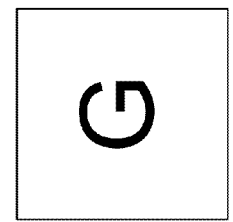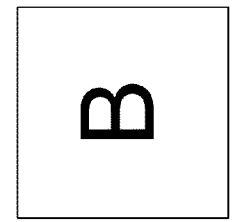
FIG. 5A

SYSTEMS AND METHODS FOR DETECTING DEFECTIVE CAMERA ARRAYS AND OPTIC ARRAYS

CROSS-REFERENCE TO RELATED APPLICATIONS

The current application claims priority under 35 U.S.C. §119(e) to U.S. Provisional Patent Application Ser. No. 61/665,724, filed Jun. 28, 2012, the disclosure of which is incorporated herein by reference.

FIELD OF THE INVENTION

The present invention generally relates to systems and methods for screening cameras for defects and more specifically to systems and methods for screening camera arrays or optic arrays that are used in the construction of camera arrays for defects.

BACKGROUND

In response to the constraints placed upon a traditional digital camera based upon the camera obscura, a new class of cameras that can be referred to as array cameras has been proposed. Array cameras are characterized in that they include an imager array that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager that does not contain pixels from another focal plane. An image is typically formed on each focal plane by its respective lens stack. In many instances, the array camera is constructed using an imager array that incorporates multiple focal planes and an optic array of lens stacks.

SUMMARY OF THE INVENTION

Systems and methods in accordance with embodiments of the invention detect defective camera arrays, and/or optic arrays and/or sensors used in the construction of array camera modules. One embodiment of the method of the invention includes: capturing image data of a known target using the plurality of cameras, where the image data forms a plurality of images; dividing each of the plurality of images into a plurality of corresponding image regions using the image processing system; identifying the presence of at least one localized defect in at least one of the plurality of the cameras by evaluating the image regions in the plurality of images in accordance with at least one predetermined localized defect criterion using the image processing system; detecting a defective camera array using the image processing system when the number of localized defects in a specific set of image regions exceeds a predetermined threshold. In addition, the specific set of image regions is formed by: a common corresponding image region from at least a subset of the plurality of images; and any additional image region in a given image that contains at least one pixel located within a predetermined maximum parallax shift distance along an epipolar line from a pixel within said common corresponding image region within the given image, where the epipolar line is defined by the relative location of the center of the camera that captured the given image and a predetermined viewpoint.

In a further embodiment of the method of the invention, identifying the presence of at least one localized defect in at least one of the plurality of the cameras by evaluating the image regions in the plurality of images in accordance with at least one predetermined localized defect criterion using the image processing system comprises identifying a plurality of defective pixels within an image region that satisfies at least one predetermined criterion.

In another embodiment of the method of the invention, the predetermined criterion is that the plurality of defective pixels within the image region exceeds a predetermined number of defective pixels.

In a still further embodiment of the method of the invention, the predetermined criterion is that the plurality of defective pixels includes a cluster of defective pixels that exceeds a predetermine size.

In still another embodiment of the method of the invention, defective pixels comprise hot pixels, bright pixels and dark pixels.

In a yet further embodiment of the method of the invention, identifying the presence of at least one localized defect in at least one of the plurality of the cameras by evaluating the image regions in the plurality of images in accordance with at least one predetermined localized defect criterion using the image processing system comprises: measuring the Modulation Transfer Function (MTF) within an image region; and determining that the MTF of the image region fails to satisfy a predetermined criterion.

In yet another embodiment of the method of the invention, the predetermined criterion is that the on-axis MTF at a predetermined spatial frequency exceeds a first predetermined threshold, the off-axis tangential MTF at a predetermined spatial frequency exceeds a second predetermined threshold, and the off-axis sagittal MTF at a predetermined spatial frequency exceeds a third predetermined threshold.

In a further embodiment again of the method of the invention, said plurality of corresponding images portions forms a first plurality of corresponding image regions and the method further comprises: dividing each of the plurality of images into a second plurality of corresponding image regions using the image processing system, where the number of image regions in the first plurality of corresponding image regions differs from the number of image regions in the second plurality of corresponding image regions; and identifying the presence of at least one localized defect in at least one of the plurality of the cameras by evaluating the image regions in the second plurality of images in accordance with at least one additional predetermined localized defect criterion using the image processing system.

In another embodiment again of the method of the invention, the plurality of images forms a reference image and a plurality of alternate view images; the specific set of image regions is formed by: a specific image region from the reference image; the image regions from each of the alternate view images that correspond to the specific image region from the reference image; and any additional image region in a given alternate view image from the plurality of alternate view images that contains at least one pixel located within a predetermined maximum parallax shift distance along an epipolar line from a pixel within the image region of the given alternate view image that corresponds to the selected image region from the reference image, where the epipolar line is defined by the relative location of the center of the camera that captured the reference image and the center of the camera that captured the given alternate view image.

In a further additional embodiment of the method of the invention, the plurality of images forms a plurality of images in each of a plurality of color channels; and a specific set of image regions is formed by image regions from the plurality of images within one of the plurality of color channels.

In another additional embodiment of the method of the invention, the plurality of images forms a reference image and a plurality of alternate view images and said plurality of images from one of the plurality of color channels does not include the reference image; and the specific set of image regions is further formed by: the image regions from each of the alternate view images within said one of the plurality of color channels that correspond to a specific image region from the reference image; and any additional image region in a given alternate view image from said one of the plurality of color channels that contains at least one pixel located within a predetermined maximum parallax shift distance along an epipolar line from a pixel within the image region of the given alternate view image that corresponds to the selected image region from the reference image, where the epipolar line is defined by the relative location of the center of the camera that captured the reference image and the center of the camera that captured the given alternate view image.

A still yet further embodiment of the method of the invention also includes detecting a defective camera array using the image processing system when the number of localized defects in a second set of image regions exceeds a second predetermined threshold, where the second set of image regions is formed by image regions from the plurality of images within a second of the plurality of color channels.

In still yet another embodiment of the method of the invention, said predetermined criterion used with respect to said specific set of image regions from said one of the plurality of color channels is different from said second predetermined criterion used with respect to said second set of image regions from said second of the plurality of color channels.

A still further embodiment again of the method of the invention includes dividing the image field of each of the plurality of lens stacks into a plurality of corresponding regions when using an optical test instrument; measuring the Modulation Transfer Function (MTF) of a known target using the optical test instrument in each of the regions; identifying the presence of at least one localized defect in at least one of the plurality of the lens stacks by evaluating the MTF measurements of the regions in the plurality of lens stacks in accordance with at least one predetermined localized defect criterion using the optical test instrument; detecting a defective optic array using the image processing system when the number of localized defects in a specific set of regions exceeds a predetermined threshold. In addition, the specific set of regions is formed by: a common corresponding region from at least a subset of the plurality of lens stacks; and any additional region in a given lens stack that forms an image within a predetermined maximum parallax shift distance along an epipolar line from said common corresponding region within the given lens stack, where the epipolar line is defined by the relative location of the center of the given lens stack and a predetermined viewpoint.

Another further embodiment of the method of the invention includes capturing image data using a camera array comprising a plurality of cameras, where at least one of the plurality of cameras includes a known localized defect impacting image data captured by the camera; disregarding image data within a region of an image captured by the at least one of the plurality of cameras that includes a known localized defect using a processor configured by a super-resolution image processing application, where the discarded image data is from a region of the camera that is known to include said known localized defect; and synthesizing a super-resolution image from the remaining image data captured by the cameras in the camera array using a super-resolution process performed by the processor configured using the super-resolution image processing application.

In still another further embodiment of the method of the invention, the camera array comprises at least one camera known to include at least one defective pixel, and the method further comprises disregarding image data captured by the pixels in the at least one camera that are known to be defective.

Another embodiment of the invention includes: an array camera module comprising a plurality of cameras formed by an imager array comprising a plurality of and an optic array comprising a plurality of lens stacks, where at least one of the plurality of cameras formed by the imager array and optic array includes a known localized defect impacting image data captured by the camera; a processor; and memory containing a super-resolution image processing application and defect data identifying said at least one of the plurality of cameras that includes a known localized defect and a region of the camera that contains the known localized defect. In addition, the super-resolution processing application configures the processor to: capture image data using the array camera module; with respect to each of said at least one of the plurality of cameras that includes a known localized defect, disregarding image data within at least one region identified by the defect data; and synthesizing a super-resolution image from the remaining image data.

In still another embodiment of the invention, memory further comprises defect data identifying at least one defective pixel within the imager array and the super-resolution processing application configures the processor to also disregard image data captured by the at least one pixel identified as defective by said defect data.

BRIEF DESCRIPTION OF THE DRAWINGS

FIGS. 5A-5E conceptually illustrate a process for determining whether a camera array is capable of synthesizing an image having acceptable image quality from image data captured by the cameras in the camera array in accordance with embodiments of the invention.

DETAILED DESCRIPTION OF THE DRAWINGS

Figure 1:
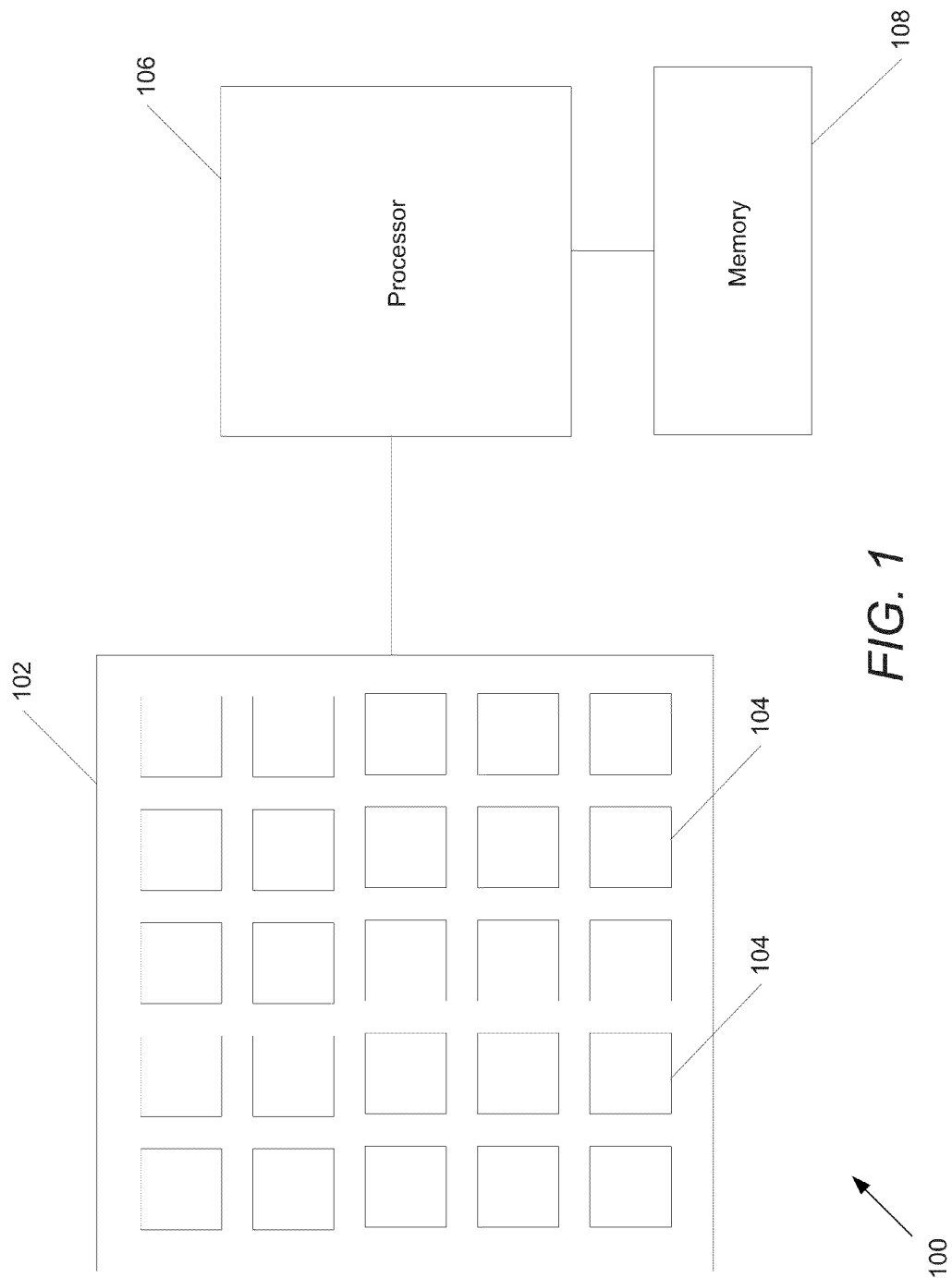
FIG. 1 conceptually illustrates a camera array implemented in the form of an array camera.

Turning now to the drawings, systems and methods for detecting defective camera arrays, and/or optic arrays and/or sensors used in the construction of array camera modules in accordance with embodiments of the invention are illustrated. A variety of defects can arise during the manufacture of a conventional digital camera that captures images using a single aperture including (but not limited to) defects in the camera optics including defects that result in unacceptable Modulation Transfer Function (MTF) performance, defective pixels in the camera's sensor, and/or defects in the assembly of the optics and sensor to form the camera. With respect to the discussion below, the term defect is used to refer to any aspect of a camera (including the sensor, optics, and/or assembly) or optic array that negatively impacts the image formed and/or image data captured by the camera. Even when a defect is localized, the defect can render the camera unsuitable for use, as the localized defect will result in unsatisfactory image quality in the impacted region of every image captured by the camera. As is discussed below, system and methods in accordance with embodiments of the invention utilize knowledge of the image processing used to synthesize images from images captured by camera arrays to determine whether localized defects in specific cameras in an array can be tolerated. In this way, yield can be improved in the manufacture of camera arrays by utilizing camera arrays that contain defects that will not impact the performance of the camera array.

A variety of camera arrays and processes for manufacturing camera arrays are disclosed in U.S. patent application Ser. No. 12/935,504, entitled "Capturing and Processing of Images using Monolithic Camera Array with Heterogeneous Images", filed May 20, 2009, the disclosure of which is incorporated by reference herein in its entirety. Multiple images of a scene can be captured by a camera array and utilized to synthesize a higher (super-resolution) image of the scene. Fusion and super-resolution processes that can be utilized to generate super-resolution images using images captured by a camera array are disclosed in U.S. patent application Ser. No. 12/967,807, entitled "System and Methods for Synthesizing High Resolution Images Using Super-Resolution Processes", filed Dec. 14, 2010, the disclosure of which is incorporated herein by reference in its entirety.

A portion of an image synthesized using a super-resolution process typically includes image data from multiple images captured by a camera array. In many instances, the complete set of images captured by a camera array is not required to achieve acceptable image quality in a region of a synthesized image. Manufacture of camera arrays results in many of the same defects that are experienced during the manufacture of conventional cameras. One approach to determining whether a camera array is defective is to identify cameras within the camera array that contain defects and to identify the entire camera array as defective when a predetermined threshold number of defective cameras is exceeded. For array cameras that include sets of cameras that form different color channels, such as those disclosed in U.S. patent application Ser. No. 12/935,504, the number of defective cameras in each color channel can be evaluated with respect to separate predetermined thresholds in order to determine whether the camera array as a whole is defective. For color channels that include fewer cameras, a smaller number of defective cameras may be tolerated. Although rejecting camera arrays as defective based on the number of cameras containing defects is effective, the process may reject camera arrays that could still be utilized to synthesize images of acceptable image quality (despite the presence of a predetermined number of localized defects within a color channel). Increased manufacturing yield can be achieved by identifying the portions of the images captured by the camera array that are impacted by defects of some cameras and evaluating whether sufficient reliable image data remains for that region from all the remaining cameras to synthesize an image. If sufficient reliable image data remains to synthesize an image, then the camera array can be utilized irrespective of the total number of cameras impacted by localized defects.

In several embodiments, a determination that a camera array is defective is made by dividing each of the images of a scene (typically a known target) captured by the cameras in the camera array into corresponding regions and determining which of the regions contain pixels that contain image data which is likely to be fused during image processing to form regions of a synthesized image. In many embodiments, the image processing involves performing a super-resolution process involving parallax detection and correction to synthesize a super-resolved image. In other embodiments, any of a variety of image processing techniques can be utilized including (but not limited to processes that synthesize) stereo-pairs of super-resolution images, video sequences synthesized using a subset of cameras in the camera array, and/or high frame rate video sequences where different frames of video are synthesized using image data captured by different subsets of the camera array. In the event that a predetermined number of the regions that are likely to be fused to form a region of a synthesized image are impacted by localized defects, then the camera array can be determined to be defective. In the context of a super-resolution process, regions that are likely to be fused to form a specific region of a synthesized image can be identified using the maximum parallax shifts that are likely to be observed between images captured by the cameras in the camera array. In several embodiments, one of the cameras in a camera array is selected as a reference camera and the remaining cameras are considered alternate view cameras. In certain embodiments, the reference camera is selected in accordance with criteria including that the reference camera does not include any defects. When a region of an image captured by the reference camera is considered, the maximum parallax shifts along epipolar lines of the pixels in the region define so called "parallax uncertainty zones" within each of the alternate view images. A determination concerning whether a camera array is defective can be made by counting the number of defects impacting pixels within the parallax uncertainty zones associated with each region within the image captured by the reference camera. Where the cameras in a camera array form multiple color channels, separate criteria based upon parallax shifts can be applied to evaluate the impact of the localized defects present in the cameras of each color channel.

As indicated above, a variety of defects can occur during component manufacture and assembly of a camera or camera array. In several embodiments, the process of evaluating whether a camera array is defective can involve evaluation the cameras in the camera array for several different types of defects including (but not limited to) defects in camera optics, defects in the pixels of camera sensors and defects in the assembly of the camera optics and sensors. In a number of embodiments, the size of the regions of the images considered when evaluating the impact of specific types of localized defects can differ. In many embodiments, larger regions are considered when evaluating the camera's optics in a given region of an image captured by the camera than the regions considered when evaluating the impact of defective pixels in the camera's sensor. In general, the smaller the regions considered (i.e. the larger the number of regions considered) during the defect detection process, the higher the anticipated yield up to a point at which the process is: identifying all camera arrays in which the defects present in the camera array can be tolerated by the super-resolution processing; and rejecting all camera arrays as defective where the defects result in insufficient reliable image data for reliably performing super-resolution processing.

Evaluating the likely impact of localized defects based upon anticipated parallax shifts can improve overall manufacturing yields, because camera arrays are not rejected as defective simply based upon a predetermined number of cameras in the camera array containing defects. Similar techniques can be utilized to evaluate optic arrays utilized in the construction of array camera modules (similar to the array camera modules discussed in U.S. patent application Ser. No. 12/935,504). In many embodiments, a Modulation Transfer Function (MTF) measurement can be made with respect to different regions of the images formed by each lens stack in an optic array. MTF is generally the most relevant measurement of optical performance, and is generally taken as an objective measurement of the ability of an optical system to transfer various levels of detail (or spatial frequency) from an object to an image. The MTF is measured in terms of contrast (degrees of gray), or of modulation, produced from a perfect source of that detail level (thus it is the ratio of contrast between the object and the image). The amount of detail in an image is given by the resolution of the optical system, and is customarily specified as spatial frequency in line pairs per millimeter (lp/mm). A line pair is one cycle of a light bar and dark bar of equal width and has a contrast of unity. Contrast can be defined as the ratio of the difference in maximum intensity ($I_{max}$) and minimum intensity ($I_{min}$) over the sum of $I_{max}$ and $I_{min}$, where $I_{max}$ is the maximum intensity produced by an image (white) and $I_{min}$ is the minimum intensity (black). The MTF then is the plot of contrast, measured in percent, against spatial frequency measured in lp/mm. The impact of errors in the lens such as (but not limited to) centering errors, form errors, and/or thickness errors that negatively impact MTF to a point at which the region of a lens stack is considered to contain a defect (i.e. MTF measurements that fail to satisfy one or more predetermined criterion) can be evaluated based upon anticipated parallax shifts during super-resolution processing. In this way, manufacturing yield can be increased by considering the regions of images impacted by defects as opposed to simply the number of defects in an optic array. Systems and methods for detecting defective camera arrays, and/or optic arrays, and techniques for synthesizing super-resolution images from images captured by array cameras containing localized defects in accordance with embodiments of the invention are discussed further below.

Camera Arrays

While much of the discussion that follows refers to systems and methods for screening for defective camera arrays, it is worthwhile initially reviewing the construction of camera arrays, the defects that can occur in the construction of camera arrays, and the manner in which information concerning localized defects can be utilized when synthesizing super-resolution images to avoid corruption of the synthesized super-resolution image by pixels impacted by the localized defects. Camera arrays can be implemented in a variety of ways including (but not limited to) as a set of discrete cameras, or as an array camera. Array cameras typically can include an array camera module and a processor.

An array camera that is configured to synthesize super-resolution images in a manner that involves disregarding image data impacted by localized defects in the cameras in the array camera in accordance with an embodiment of the invention is illustrated in FIG. 1. The array camera 100 includes an array camera module 102 including an array of individual cameras 104 where an array of individual cameras refers to a plurality of cameras in a particular arrangement, such as (but not limited to) the square arrangement utilized in the illustrated embodiment. The array camera module 102 is connected to the processor 106 and the processor 106 is connected to a memory 108. In a number of embodiments, the memory contains a super-resolution image processing application that is configured to synthesize a super-resolution image using image data captured by the camera module 102 using a process such as (but not limited to) one of the processes outlined in U.S. patent application Ser. No. 12/967,807. In several embodiments, the memory 108 contains information concerning image data captured by the camera module 102 that is unreliable due to localized defects in the cameras within individual cameras 104 within the camera module 108. The information can be in the form of regions of images that can be disregarded and/or individual pixels or clusters of pixels that can be disregarded. The super-resolution image processing application can utilize the information concerning the image data that is unreliable in the captured images to disregard the unreliable image data when performing super-resolution processing.

Although a specific array camera is illustrated in FIG. 1, any of a variety of different array camera configurations can be utilized in accordance with many different embodiments of the invention. Furthermore, the basic configuration shown in FIG. 1 can also be utilized in an image processing system that can be utilized to detect the presence of localized defects in a camera module and to determine whether the localized defects result in the overall camera module being defective for the purposes of synthesizing super-resolution images using the image data captured by the individual cameras within the camera module.

Array Camera Modules

Figure 2:
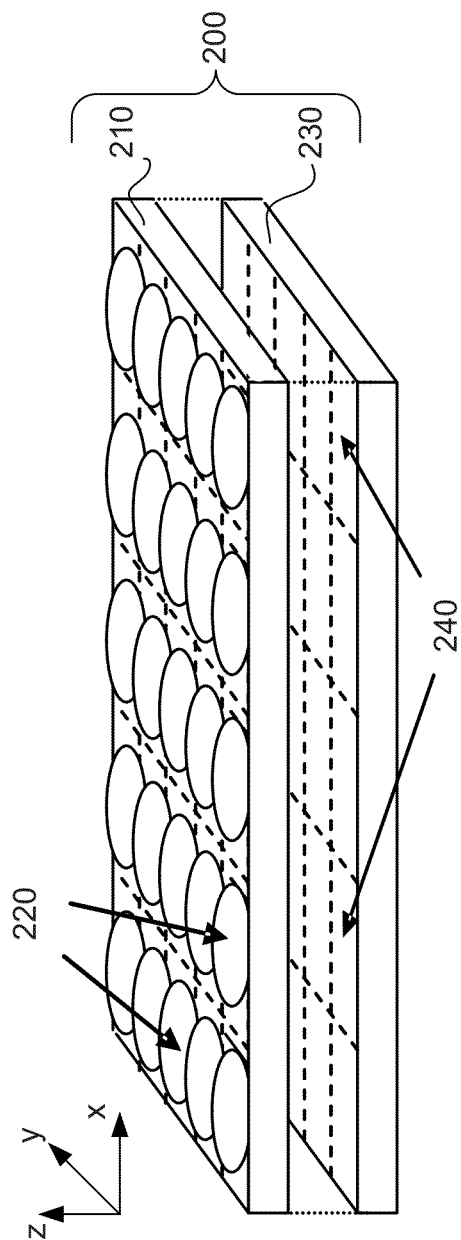
FIG. 2 conceptually illustrates an array camera module constructed from an optic array and an imager array.

The defects that can be present in array cameras typically arise from the manner in which array camera modules are constructed. Array camera modules, such as the array camera modules discussed above with respect to FIG. 1, can be constructed from an imager array and an optic array in the manner illustrated in FIG. 2. The camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels within a corresponding focal plane 240. Each pairing of a lens stack 220 and focal plane 240 forms a single camera 104 within the array camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes.

In several embodiments, color filters in individual cameras can be used to form multiple color channels within the array camera module. In this way, cameras can be used to capture data with respect to different colors, or a specific portion of the spectrum. In contrast to applying color filters to the pixels of the camera, color filters in many embodiments of the invention can be included in the lens stack. For example, a green color camera can include a lens stack with a green light filter that allows green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules can be implemented in a variety of ways including (but not limited to) by applying color filters to the pixels of the focal planes of the camera module similar to the manner in which color filters are applied to the pixels of a camera that uses a conventional Bayer color filter pattern. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

The defects that can be present in a camera module include (but are not limited to) defective pixels, a lens stack including one or more lens surfaces that deviate from the relevant prescriptions for the surfaces, and defects associated with the manner in which the sensor and the optic array are combined to form the camera module. The types of defective pixels that may be present can include (but are not limited to) hot pixels (pixels that generate a signal above a predetermined mean dark signal when the sensor array is not illuminated), bright pixels (pixels that produce values that exceed a predetermined threshold above the values produced by neighboring pixels under similar illumination conditions), and dark pixels (pixels that produce values lower than a predetermined threshold below the values produced by neighboring pixels under similar illumination conditions). The specific types of pixel defects that can be detected in accordance with embodiments of the invention typically depend upon the requirements of a specific application. As noted above, a variety of characteristics of the optics of a camera can result in sufficient deterioration to be considered defects in accordance with embodiments of the invention. In many embodiments, defects in a region of a lens can be detected by measuring whether one or both of the tangential and/or sagittal MTF components (sometimes referred to as the horizontal and vertical components) fail to exceed one or more predefined thresholds. Additional defects that can be detected include (but are not limited to) blemishes in the optics and/or that result from assembly. Although specific categories of localized defect are described above, processes in accordance with embodiments of the invention can evaluate the impact of any of a variety of defects that are localized to a region of a camera within a camera array on the performance of the camera array using information concerning the manner in which images will be synthesized from the image data captured by the camera array.

Although specific array camera modules and defects that can occur during the manufacture of array camera modules are discussed above, many different array camera modules can be constructed and systems and methods in accordance with embodiments of the invention can detect the presence of the types of defects that typically arise in the construction of a specific type of array camera module. In order to provide some additional background concerning the operation of imager arrays and the manner in which the imager arrays capture image data for use in super-resolution processing, imager arrays that can be utilized in the construction of array camera modules in accordance with embodiments of the invention are discussed further below.

Imager Arrays

Figure 3:
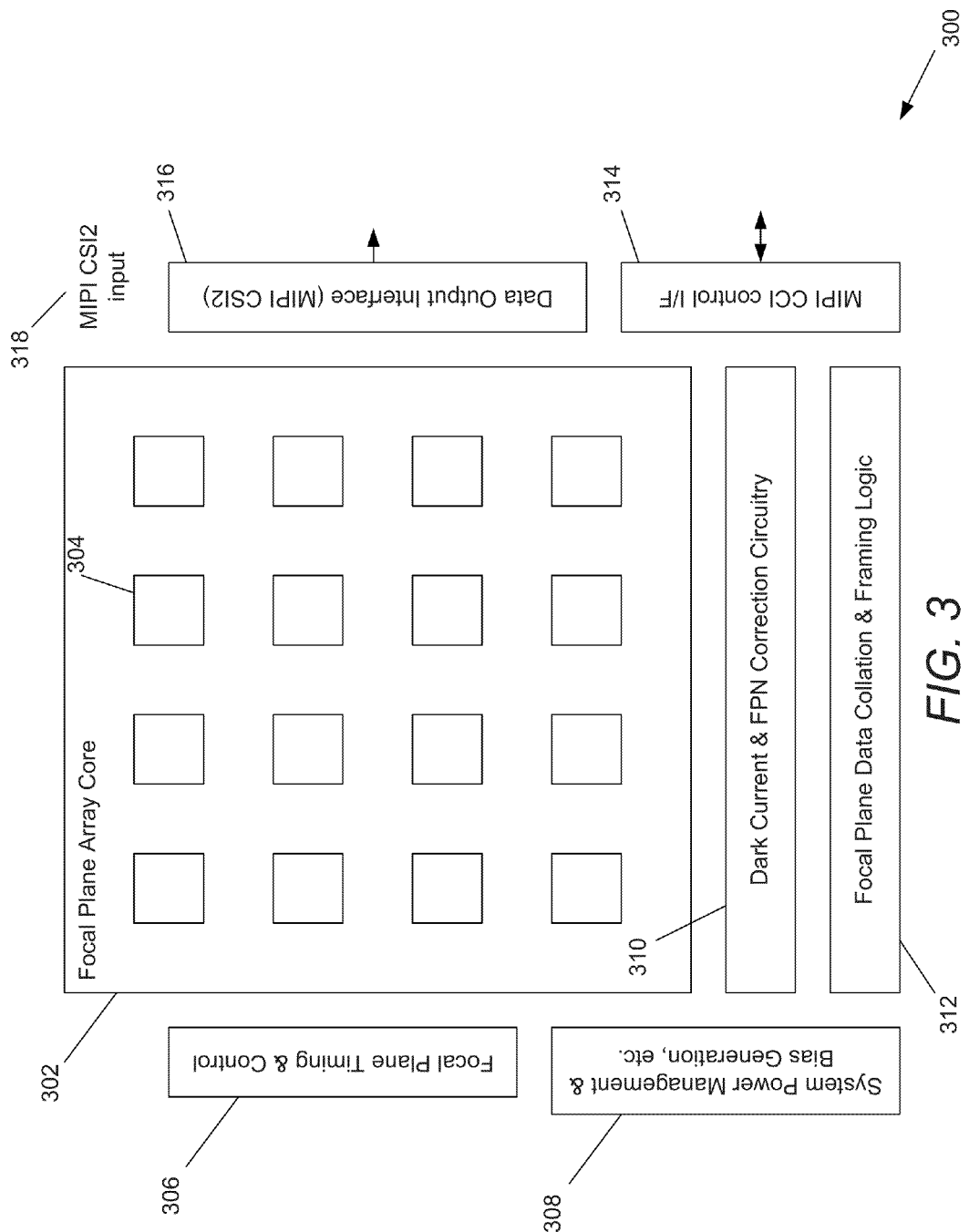
FIG. 3 illustrates the circuitry in an image array that can be utilized in the construction of an array camera module.

An imager array that can be utilized in the construction of an array camera module and in which the image capture settings of a plurality of focal planes can be independently configured is illustrated in FIG. 3. The imager array 300 includes a focal plane array core 302 that includes an array of focal planes 304 and all analog signal processing, pixel level control logic, signaling, and analog-to-digital conversion (ADC) circuitry. The imager array also includes focal plane timing and control circuitry 306 that is responsible for controlling the capture of image information using the pixels. In a number of embodiments, the focal plane timing and control circuitry utilizes reset and read-out signals to control the integration time of the pixels. In other embodiments, any of a variety of techniques can be utilized to control integration time of pixels and/or to capture image information using pixels. In many embodiments, the focal plane timing and control circuitry 306 provides flexibility of image information capture control, which enables features including (but not limited to) high dynamic range imaging, high speed video, and electronic image stabilization. In various embodiments, the imager array includes power management and bias generation circuitry 308. The power management and bias generation circuitry 308 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern (FPN) correction circuitry 310 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN.

In many embodiments, a single self-contained chip imager array includes focal plane framing circuitry 312 that packages the data captured from the focal planes into a container file and can prepare the captured image data for transmission. In several embodiments, the focal plane framing circuitry includes information identifying the focal plane and/or group of pixels from which the captured image data originated. In a number of embodiments, the imager array also includes an interface for transmission of captured image data to external devices. In the illustrated embodiment, the interface is a MIPI CSI 2 output interface (as specified by the non-profit MIPI Alliance, Inc.) supporting four lanes that can support read-out of video at 30 fps from the imager array and incorporating data output interface circuitry 318, interface control circuitry 316 and interface input circuitry 314. Typically, the bandwidth of each lane is optimized for the total number of pixels in the imager array and the desired frame rate. The use of various interfaces including the MIPI CSI 2 interface to transmit image data captured by an array of imagers within an imager array to an external device in accordance with embodiments of the invention is described in U.S. Pat. No. 8,305,456, entitled "Systems and Methods for Transmitting Array Camera Data", issued Nov. 6, 2012, the disclosure of which is incorporated by reference herein in its entirety.

Although specific components of an imager array architecture are discussed above with respect to FIG. 3, any of a variety of imager arrays can be constructed in accordance with embodiments of the invention that enable the capture of images of a scene at a plurality of focal planes in accordance with embodiments of the invention. Independent focal plane control that can be included in imager arrays in accordance with embodiments of the invention are discussed further below.

Independent Focal Plane Control

Figure 4:
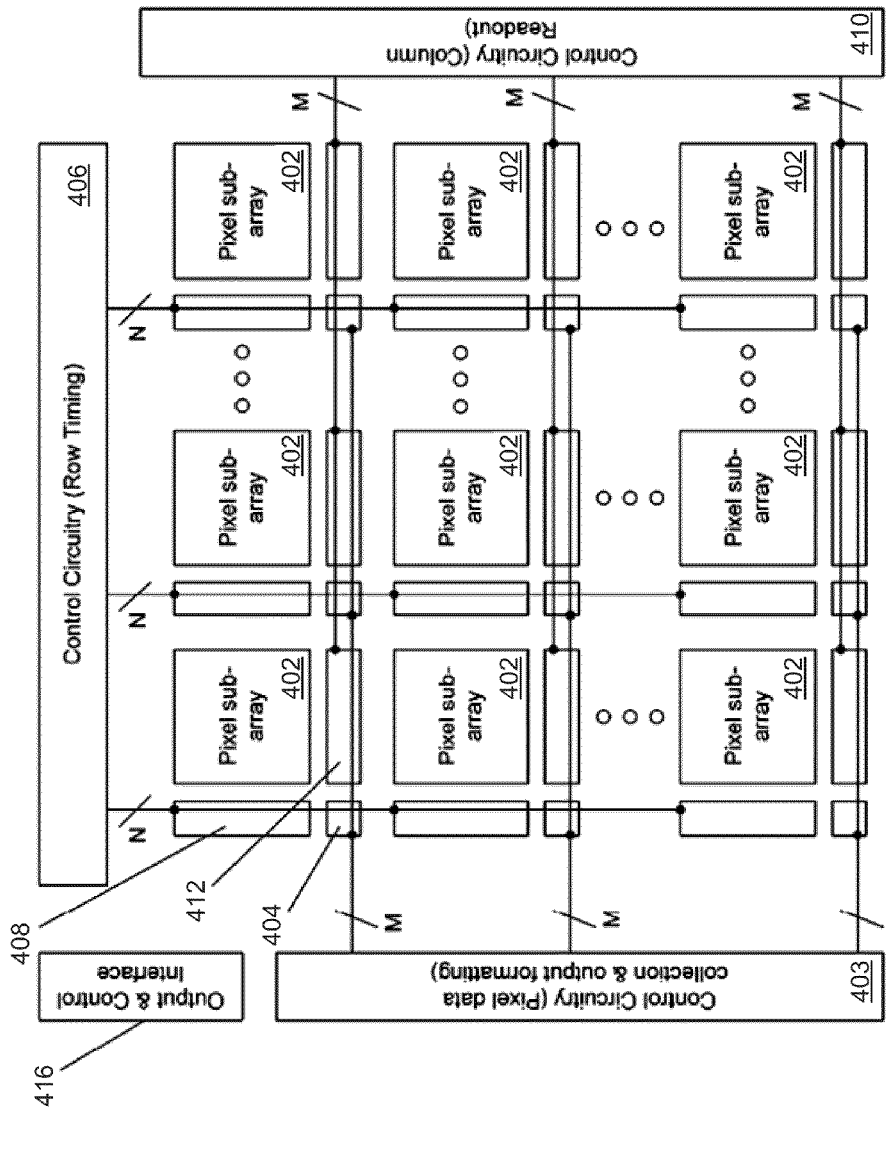
FIG. 4 illustrates circuitry utilized in the independent control and read out of pixel sub-arrays that form focal planes on an imager array that can be utilized in the construction of an array camera module.

Imager arrays in accordance with embodiments of the invention can include an array of focal planes that can independently be controlled. In this way, the image capture settings for each focal plane in an imager array can be configured differently. An imager array including independent control of image capture settings and independent control of pixel readout in an array of focal planes in accordance with an embodiment of the invention is illustrated in FIG. 4. The imager array 400 includes a plurality of focal planes or pixel sub-arrays 402. Control circuitry 403, 404 provides independent control of the exposure timing and amplification gain applied to the individual pixels within each focal plane. Each focal plane 402 includes independent row timing circuitry 406, 408, and independent column readout circuitry 410, 412. In operation, the control circuitry 403, 404 determines the image capture settings of the pixels in each of the active focal planes 402. The row timing circuitry 406, 408 and the column readout circuitry 410, 412 are responsible for reading out image data from each of the pixels in the active focal planes. The image data read from the focal planes is then formatted for output using an output and control interface 416.

Although specific imager array configurations are discussed above with reference to FIG. 4, any of a variety of imager array configurations including independent and/or related focal plane control can be utilized in accordance with embodiments of the invention including those outlined in U.S. patent application Ser. No. 13/106,797, entitled "Architectures for Imager Arrays and Array Cameras", filed May 12, 2011, the disclosure of which is incorporated by reference herein in its entirety. As is discussed further below, the image data captured by an imager array can be utilized to detect localized defects in the cameras formed by an array camera module and to evaluate whether the defects will ultimately render the entire array camera module defective.

Evaluating Defects in Camera Arrays

Camera arrays can capture information in multiple color channels or spectral cameras, where specific cameras are configured to only capture image data within a single color channel or spectral band. A 4×4 camera array that is configured to capture red, green, and blue image data is conceptually illustrated in FIG. 5A. As noted above, super-resolution processes including (but not limited to) the process disclosed in U.S. patent application Ser. No. 12/967,807 can be utilized to take image data captured by each of the cameras in the camera array and synthesize a super-resolution image. The process of synthesizing a super-resolution image from images captured by multiple cameras having different viewpoints involves identifying pixel shifts that can be applied to the image data to shift all of the captured image data to a single viewpoint. Referring to the camera array illustrated in FIG. 5A, a reference camera 500 can be designated and all of the remaining cameras can be considered alternate view cameras. One approach to determining the appropriate shifts to apply to the pixels of the images captured by the alternate view cameras to shift the pixels into the viewpoint of the reference camera is to determine the distance to objects within the scene captured by the reference camera. These distances can then be used to determine the anticipated parallax shifts in the alternate view images, which can then be corrected. The parallax shifts in the alternate view images will typically occur along epipolar lines, which are determined based upon the relative locations of the centers of the reference camera and the alternate view camera. Processes for detecting and correcting for parallax shifts are disclosed in U.S. Provisional Patent Application Ser. No. 61/780,906, entitled "Systems and Methods for Parallax Detection and Correction in Images Captured Using Array Cameras", filed Mar. 13, 2013, the disclosure of which is incorporated by reference herein in its entirety. As is discussed in U.S. Provisional Patent Application Ser. No. 61/780,906, disparity searches performed when conducting parallax detection and correction can be bounded based upon a maximum observed parallax shift. As is discussed further below with reference to FIGS. 5B-5E, an appreciation of these bounds can be utilized to determine whether localized defects in the cameras of a camera array will impact the image quality of images synthesized using images captured by the camera array.

Using Bounds on Parallax Shifts to Evaluate Impact of Localized Defects

Systems and methods for screening camera arrays for defects in accordance with many embodiments of the invention attempt to evaluate whether the image data captured by a camera array includes sufficient reliable image data to reliably synthesize a super-resolution image. In several embodiments, the sufficiency of the captured image data is determined by considering the super-resolution image as a set of regions synthesized from image data captured by pixels in regions in each of the images captured by the camera array. While the locations of the regions in the images correspond with the locations of the regions in the super-resolution image, it should be noted that the effects of parallax can mean that a region of a super-resolution image can be synthesized from image data captured from more than just the corresponding regions of the images captured by the camera array. The process of synthesizing a region of the super-resolution image involves shifting all of the image data captured by the cameras in the camera array to the viewpoint from which the super-resolution image is synthesized, which can include shifting image data captured by pixels from multiple regions of a camera. Although much of the discussion that follows assumes that the super-resolution image is synthesized from the viewpoint of a reference camera, super-resolution images can also be synthesized from virtual viewpoints. In which case, parallax corrections are applied to all of the image data.

The reliability with which the region of the super-resolution image can be synthesized based upon captured image data can be evaluated by identifying pixels in the image data that could be utilized to synthesize the super-resolution image and which may be impacted by a localized defect. As noted above, the parallax shifts that are likely to be observed in captured image data are typically bounded. Therefore, these maximum parallax shift bounds can be utilized to identify pixels in image data captured by specific cameras within an array that could be utilized to synthesize a region of a super-resolution image depending upon the nature of a scene. The specific pixels that will be utilized to synthesize a region of a super-resolution image will typically depend upon the distance(s) to objects within the scene that are visible within the synthesized region of the super-resolution image. Regions of the images captured by specific cameras within a camera array that contain pixels that could be utilized to synthesize a region of a super-resolution image (identified based upon the parallax shift bounds) can be referred to as parallax uncertainty zones with respect to the region of the super-resolution image. These parallax uncertainty zones contain the pixels that could be utilized to synthesize the associated region of the super-resolution image under all possible imaging conditions (i.e. across all possible object distances). By identifying the number of localized defects (if any) that impact pixels contained within the parallax uncertainty zones, systems and methods in accordance with embodiments of the invention can identify the amount of image data that must be disregarded during the synthesis of the region of the super-resolution image. If the amount of image data that must be disregarded (i.e. the number of localized defects impacting pixels contained within the parallax uncertainty zones) exceeds a predetermined amount, then the camera array can be determined to be defective for the purpose of synthesizing super-resolution images. Although much of the discussion that follows focuses on synthesizing super-resolution images, similar processes can be utilized to evaluate whether sufficient reliable image data is available to synthesize other types of image(s) such as (but not limited to) stereo-pairs of super-resolution images, and/or video sequences synthesized using a subset of cameras in the camera array.

Figure 5B:
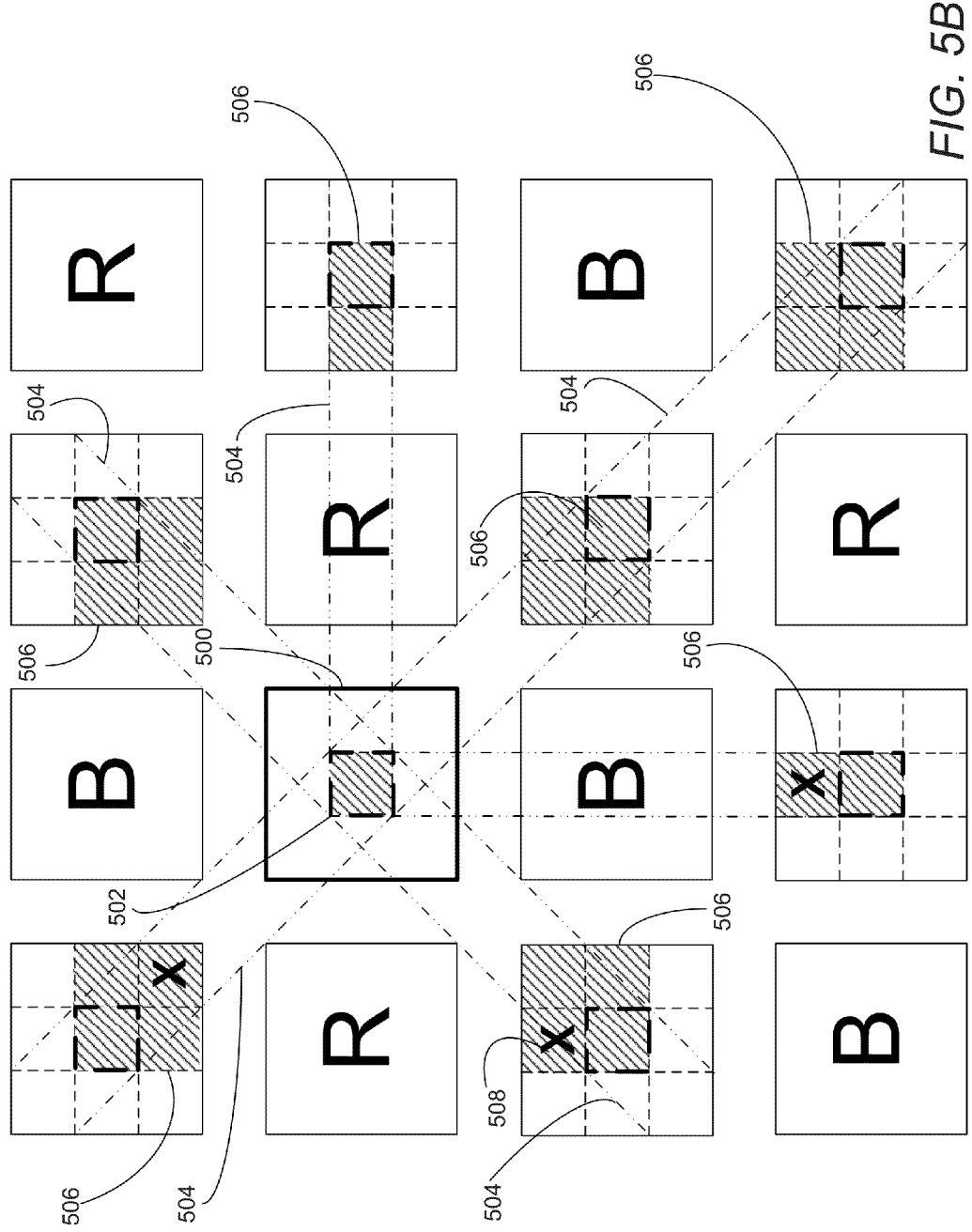

In order to provide a concrete example of the processes outlined above, a process for determining whether localized defects in the cameras of the 4×4 camera array illustrated in FIG. 5A render the camera array defective for the purpose of synthesizing super-resolution images from the viewpoint of the reference camera 500 in accordance with an embodiment of the invention is conceptually illustrated in FIGS. 5B-5E. The 4×4 camera array illustrated in FIG. 5A includes cameras that capture red, green, and blue image data. In evaluating the camera array, each color channel can be considered separately. Referring first to FIG. 5B, the sufficiency of the reliable image data captured by cameras within the green color channel is considered with respect to a region of the super-resolution image defined by dividing the super-resolution image into a 3×3 grid and dividing each of the images captured by the camera array into corresponding 3×3 grids. Although regions defined using 3×3 grids are utilized to illustrate the process shown in FIGS. 5B-5E, the number of regions can be selected based upon the requirements of specific applications and, as is discussed further below, the size of the regions can differ when considering different types of defects that may be present within a given camera array. Due to the fact that the super-resolution image is synthesized from the viewpoint of the reference camera 500, the region of the super-resolution image that is being considered corresponds to a region 502 of the reference camera (i.e. the anticipated parallax shifts to shift image data captured by pixels of the reference camera into the viewpoint of the synthesized super-resolution image is zero). In the illustrated embodiment, epipolar lines 504 and maximum parallax shifts are utilized to identify regions within the alternate view green cameras that contain pixels that could potentially capture image data that could be utilized to synthesize the region of the super-resolution image under all possible imaging conditions. In the illustrated embodiment, a maximum parallax shift is assumed that is approximately equal to the relevant dimension of one of the regions (i.e. somewhere between the length of the diagonal and the length of an edge of the region depending on the location of the camera within the array). In actual applications, the maximum parallax shift that is observed typically depends upon the location of an alternate view camera relative to the reference camera. In certain embodiments, different maximum parallax shifts are utilized based upon camera location. In other embodiments, the same maximum parallax shift is utilized irrespective of the camera location to simplify analysis. The specific parallax shift(s) that are assumed typically depend upon the spacing and focal length of the cameras in a specific camera array.

The identified regions within the alternate view green cameras that contain at least one pixel that could potentially capture image data used to synthesize a given region of the super-resolution image define the parallax uncertainty zones 506 for the given region of the super-resolution image. In FIGS. 5B-5E, parallax uncertainty zones are illustrated as shaded regions within each camera. Once the parallax uncertainty zones are identified, the process of determining whether the camera array captures sufficient reliable image data to reliably synthesize super-resolution images under all imaging conditions involves simply counting the number of defects that impact pixels within the parallax uncertainty zones. When the counted number of defects within any of the parallax uncertainty zone exceeds a predetermined number, then the camera array is considered defective. In a number of embodiments, less than three localized defects impacting regions within the parallax uncertainty zones can be tolerated. Referring again to FIG. 5B, localized defects are indicated using the symbol "X". As can be readily appreciated, the presence of three localized defects (X) within the uncertainty zones of the region of the super-resolution image being evaluated would result in the illustrated camera array being considered defective.

The ability to define parallax uncertainty zones in a predetermined manner can simplify processes for detecting defective camera arrays in accordance with embodiments of the invention during the manufacturing of camera arrays. Processes for determining whether camera arrays are defective can simply involve determining regions of the cameras that contain localized defects and then using lookup tables to identify the parallax uncertainty zones to consider when evaluating whether the localized defects render the overall camera array defective for the purpose of synthesizing a desired type of image(s).

In many embodiments of the invention, the process of evaluating whether a camera array is defective involves evaluating whether regions within parallax uncertainty zones contain localized defects. The regions of a camera that are considered part of a parallax uncertainty zone for a given region of a super-resolution image are regions that contain at least one pixel that could potentially capture image data that could be utilized to synthesize the given region of the super-resolution image under all possible imaging conditions. It is also worth noting that a region that is part of a parallax uncertainty zone can also include pixels that capture image data that will not be utilized by the super-resolution process to synthesize the given region of the super-resolution image under any imaging conditions (i.e. pixels that shift along epipolar lines to different regions of the super-resolution image). For example, region 508 contains such pixels. In the event that the localized defect impacting region 508 does not impact pixels that could potentially capture image data used in the synthesis of the given region of the super-resolution image, then the camera array could theoretically still be used to synthesize super-resolution images of acceptable image quality despite failing to the criterion outlined above. Accordingly, yield can be further increased by reducing the size of the regions (i.e. using more than a 3×3 grid, e.g. a 6×8 grid and/or any other grid appropriate to the requirements of the invention). As is discussed further below, the size of the regions considered can depend upon by the specific type of defect being detected. For example, defective pixels can be identified individually and so very small regions can be considered when evaluating the impact of defective pixels. By contrast, MTF calculations typically require image data captured by a larger number of pixels. Therefore, larger regions may be utilized when evaluating the impact of defects in the lens stacks of optic array of an array camera module. In addition, the size, number and location of the regions for testing the optic array only can be already defined by the setup of the MTF testing equipment, e.g. if optical testing instrument use 9 reticles and corresponding cameras in the tester (on-axis, 4 at intermediate field heights on H and V axes of "image" and 4 in the corners). Accordingly, a single screening process can utilize different sized regions when evaluating the impact of different types of defects as part of the process of determining whether a camera array is sufficiently reliable to be utilized in synthesizing a desired type of image.

Figure 5C:
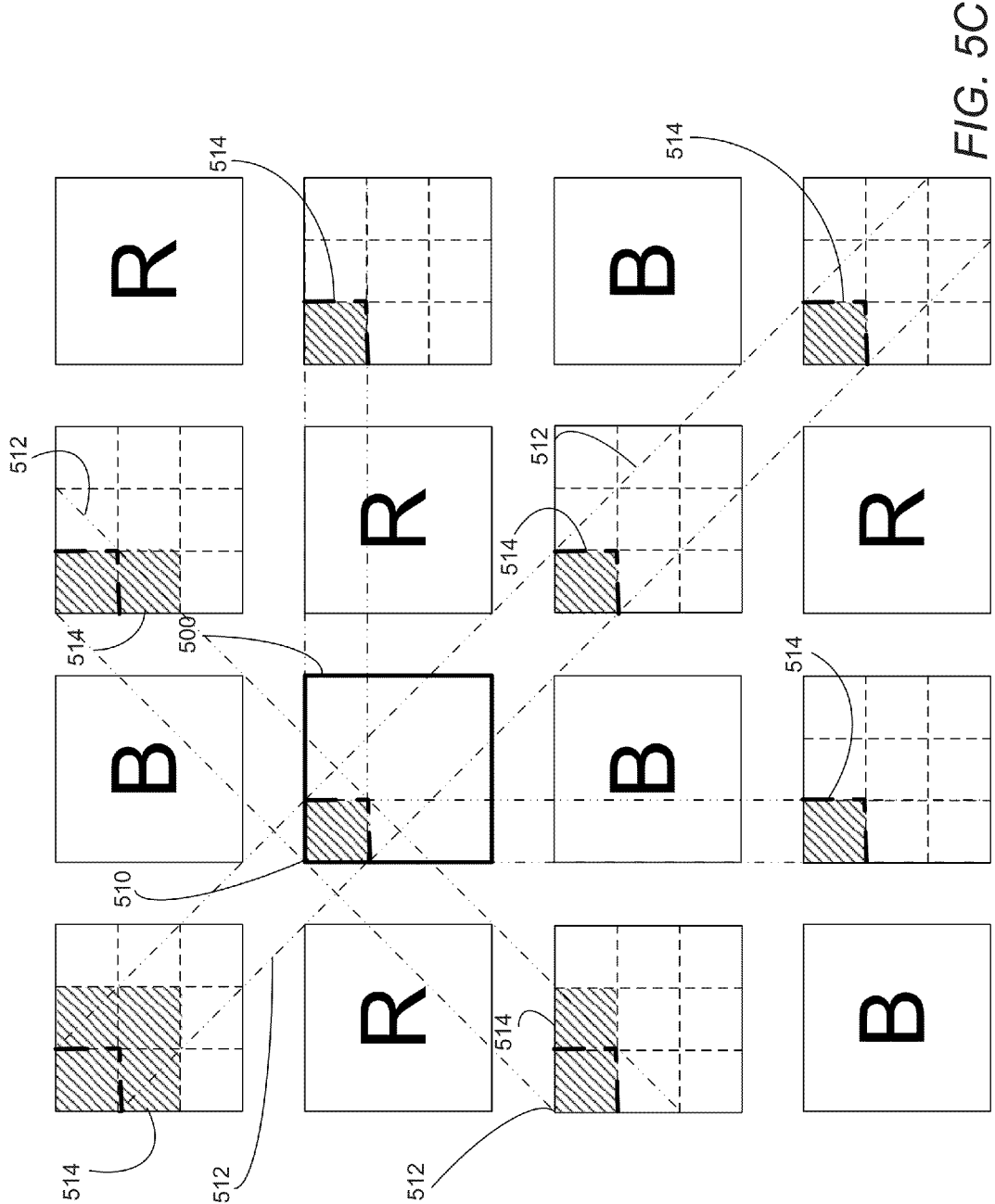
Figure 5D:
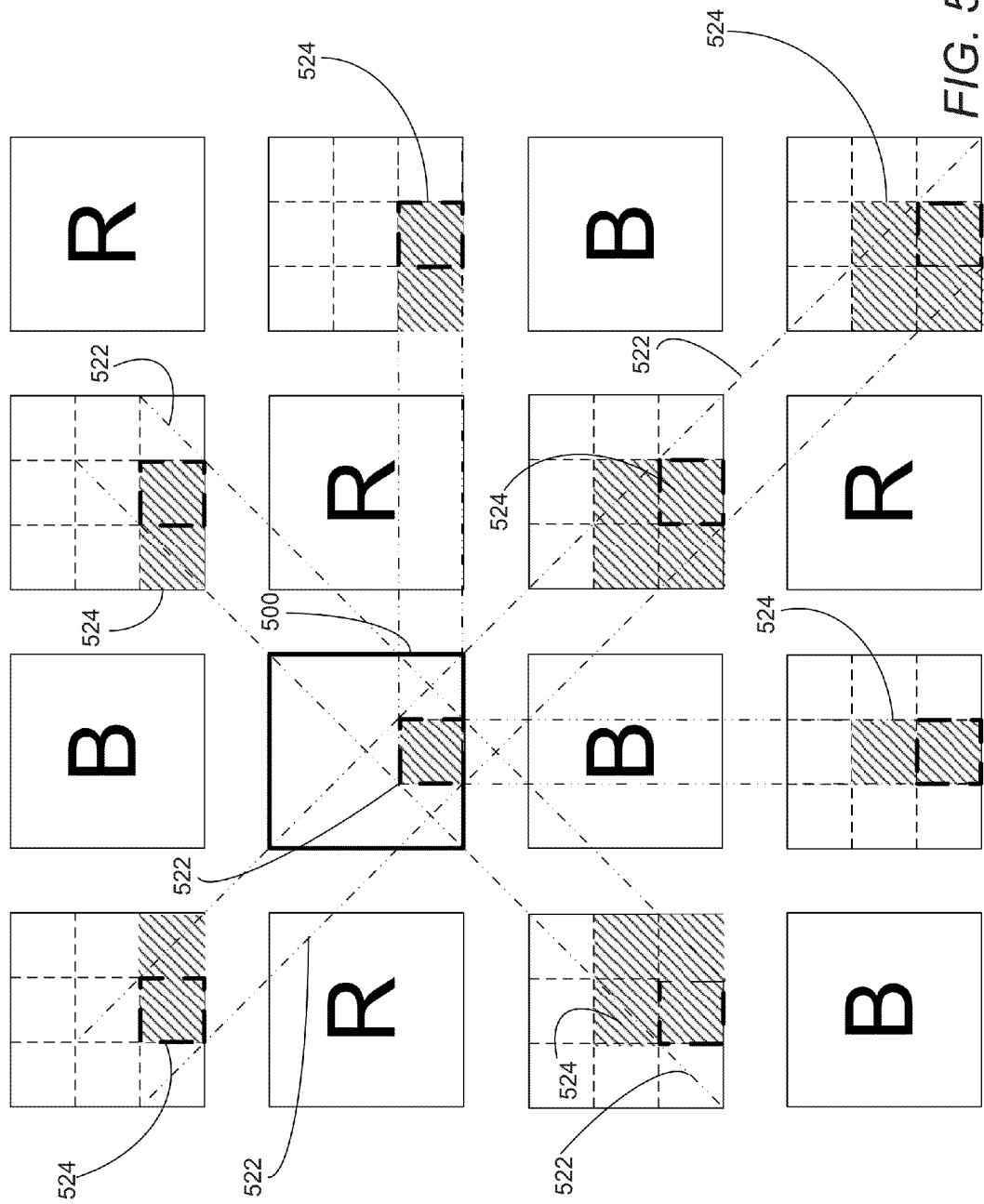
Figure 5E:
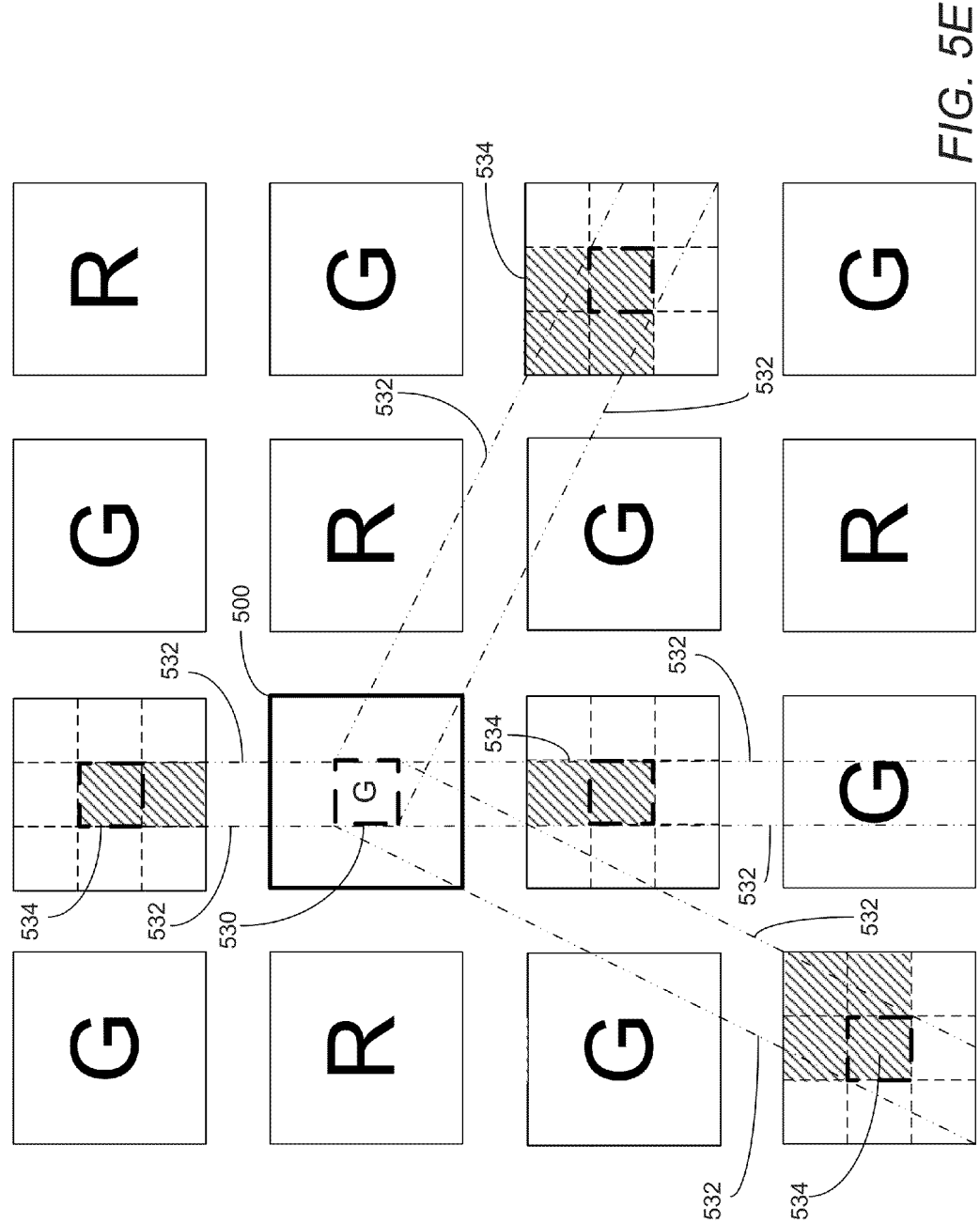

The manner in which parallax uncertainty zones are defined with respect to various regions of a super-resolution image can be further appreciated with reference to FIGS. 5C-5E. With specific regard to FIGS. 5C and 5D, different regions of the super-resolution image are selected corresponding to region 510 and region 520 in the reference camera (shown in FIG. 5C and FIG. 5D respectively). Epipolar lines 512, 522 and maximum parallax shift bounds are utilized to identify parallax uncertainty regions 514, 524 and the number of localized defects impacting pixels within the parallax uncertainty zones 514, 524 can then be determined. When the number of localized defects impacting pixels within the parallax uncertainty zones exceeds a predetermined threshold number, then the camera array can be considered defective for the purpose of synthesizing super-resolution images.

The reference camera 500 in the camera array illustrated in FIG. 5A is a camera that captures image data within a green color channel. The process of synthesizing a super-resolution image can also involve shifting image data captured by cameras within other color channels to the viewpoint of the reference camera. In several embodiments, the process of evaluating whether a camera array can reliably synthesize a super-resolution image involves evaluating whether defects in cameras that are part of a color channel that does not contain the reference camera are likely to result in unacceptable image quality in a super-resolution image synthesized using image data captured by the camera array. The process for evaluating the likely impact of localized defects in cameras that are part of a color channel that does not contain the reference camera is similar to the process outlined above. Epipolar lines and maximum parallax shift bounds are utilized to identify regions within the alternate view cameras within the color channel that constitute parallax uncertainty zones for a specific region of a synthesized super-resolution image. In many instances, the number of cameras within the camera array used to capture image data in different color channels may vary. Therefore, a different threshold may be utilized to determine whether an array camera is defective in each color channel.

A process for evaluating whether the camera array illustrated in FIG. 5A is defective for the purpose of synthesizing a full-color super-resolution image due to localized defects present in cameras that are part of a blue color channel in accordance with embodiments of the invention is conceptually illustrated in FIG. 5E. The process involves selecting a region of the super-resolution image that corresponds to a region 530 of the reference camera 500. Although the region 530 corresponding to the selected region of the super-resolution image is shown in FIG. 5E, the reference camera does not capture image data in the blue color channel and so the reference camera is not considered for the purposes of evaluating the cameras in the blue color channel. The region 330 is simply shown for the purpose of illustrating the manner in which the parallax uncertainty regions within the cameras that are part of the blue channel are determined. Epipolar lines and maximum parallax shift bounds are utilized to identify parallax uncertainty regions in the cameras within the blue channel with respect to the selected region of the super-resolution image. A determination can be made as to the number of localized defects (of any type) that impact regions within the parallax uncertainty zones of the cameras within the blue color channel. Where the number of regions within the parallax uncertainty zones impacted by localized defects exceeds a predetermined threshold, then the camera array can be determined to be defective for the purpose of synthesizing full-color super-resolution images. With specific regard to the 4×4 camera array illustrated in FIG. 5A, the number of defects that can be tolerated in the parallax uncertainty zones of a specific region of a super-resolution image before the camera array is considered defective is a single defect. In other embodiments, the number of localized defects that are tolerated within the parallax uncertainty zones can be determined based upon the requirements of a specific application.

Although the processes discussed above with respect to FIG. 5E are discussed in the context of the cameras that form the blue color channel in the camera array shown in FIG. 5A, similar processes can be applied to determine whether defects in the cameras that form the red color channel compromise the reliability with which super-resolution images can be synthesized using image data captured by the camera array. Furthermore, the above discussion of color channels that do not contain a reference camera is presented primarily with reference to red and blue color channels. Any color channel, however, can be evaluated using processes similar to those outlined above as appropriate to the requirements of specific applications in accordance with embodiments of the invention. Indeed, all color channels captured by a camera array can be evaluated using processes similar to those described above with reference to FIG. 5E when a super-resolution image is synthesized from a virtual viewpoint (i.e. none of the color channels include a camera that captures image data from the viewpoint from which the super-resolution image is synthesized).

Processes for Detecting Defective Camera Arrays

Processes for manufacturing camera arrays, including (but not limited to) camera arrays implemented using an array camera module, can incorporate processes that screen for defective camera arrays. In many embodiments, the screening processes identify defects and the regions within the cameras in the camera array that capture image data, which are impacted by the identified defects. The process can then count the number of regions impacted by defects within specific sets of regions, where each set of regions constitutes the parallax uncertainty zones for a specific region of a super-resolution image that can be synthesized using image data captured by the camera array. In many embodiments, the specific sets of regions can include different sets for each color channel used to synthesize a region of a super-resolution image. In this way, predetermined parallax uncertainty zones can effectively be defined as a set of look up tables (or similar data structures) without the need to continuously perform the calculations to determine the parallax uncertainty zones (which are typically the same for each similar camera array being manufactured and tested).

Figure 6:
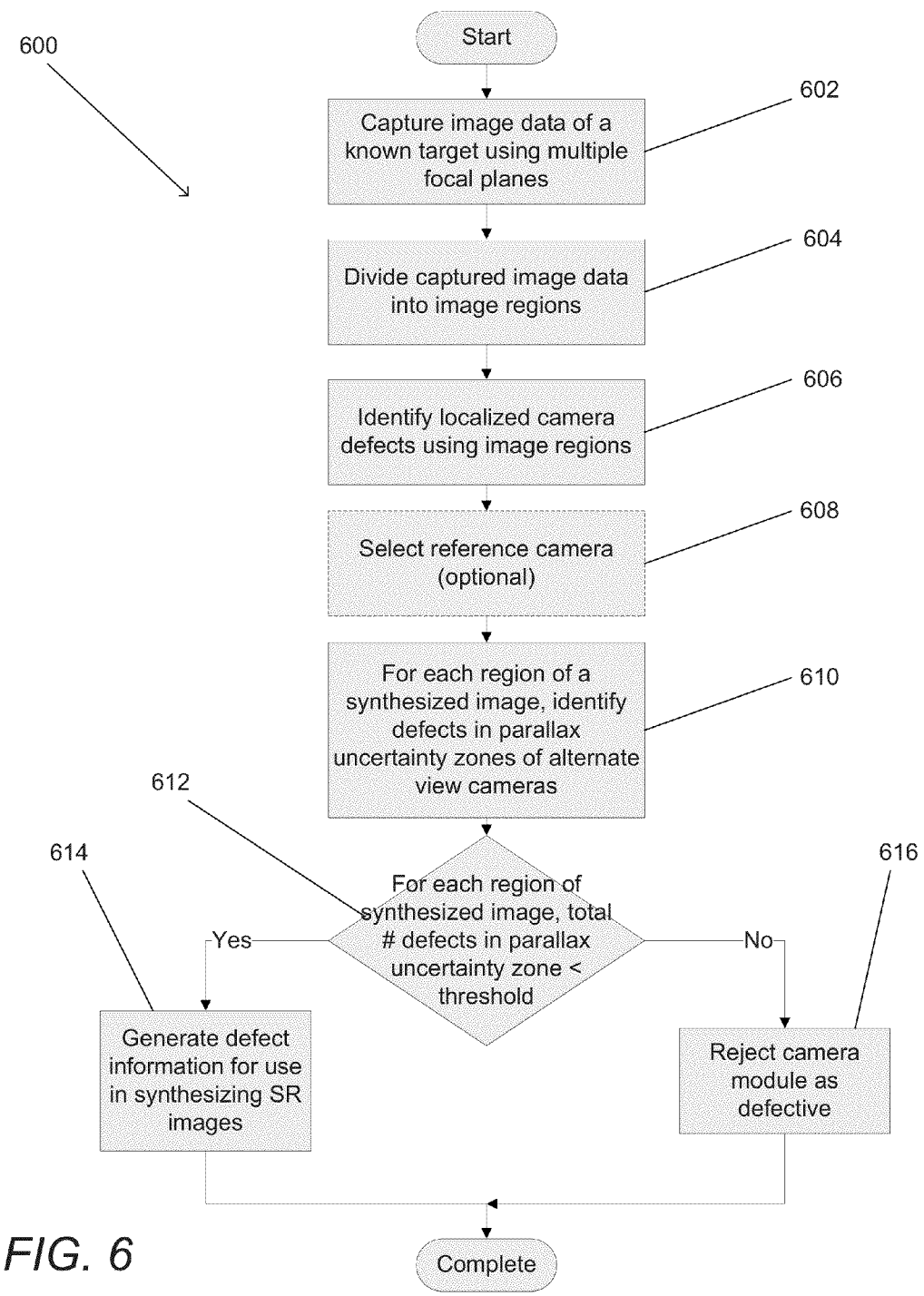
FIG. 6 is a process for determining whether a camera array is defective due to the presence of localized defects in predetermined parallax uncertainty zones in accordance with an embodiment of the invention.

A process for screening camera arrays to identify defective camera arrays in accordance with an embodiment of the invention is illustrated in FIG. 6. The process 600 includes capturing (602) image data of a known target using multiple focal planes. In many embodiments, the target includes features that enable evaluation of captured image data for the purpose of detecting localized defects within the array camera. In a number of embodiments, a target is used that enables local measurement of MTF at multiple field locations such as (but not limited to) targets that incorporate slanted edge targets (for both tangential and sagittal components), bar targets (for both tangential and sagittal components) and/or Siemens stars. In certain embodiments, the specific types of targets are repeatedly arranged to be imaged into different regions. The captured image data is divided (604) into regions and any localized defects are identified (606) within the regions. Processes in accordance with embodiments of the invention can screen for multiple different types of defects including (but not limited to) defects in the lens stack of a camera, defects in a camera's sensor, and defects resulting from the incorrect assembly of the camera optics and sensor. As is discussed further below, the process of dividing the captured image data into regions can involve dividing the captured image data into different sized regions for the purpose of evaluating the impact of different types of images on the image quality of super-resolution images synthesized by the camera array.

In a number of embodiments, a reference camera is selected (608). As is discussed further below, processes in accordance with many embodiments of the invention require that the reference camera utilized in the synthesis of super-resolution images be free of localized defects. Accordingly, the process of selecting a reference camera can involve selecting candidate reference cameras and evaluating whether any of the candidate reference cameras are free from defects. In the event that none of the candidate reference cameras are free from defects, the camera array may be rejected.

The process of screening the camera array can then involve identifying (610) defects that impact image data captured by regions within the parallax uncertainty zones of each region of a super-resolution image that can be synthesized using image data captured by the camera array. As noted above, this can involve utilizing look up tables (or similar rapidly accessible data structures) to count the number of defects that occur in specific sets of regions corresponding to the parallax uncertainty zones (in each color channel) for each region of a super-resolution image that can be synthesized using the camera array. The number of defects in each of the specific sets of regions can then be evaluated to determine (612) whether the number exceeds a predetermined threshold. In many embodiments, different thresholds can be defined for different sets of regions. In several embodiments, different thresholds apply to the sets in each of the different color channels supported by the camera array. In embodiments where the number of defects in each instance is sufficiently low to satisfy the thresholds, then the camera array is determined to be capable of synthesizing super-resolution images of acceptable image quality and information concerning the defects can be stored for use by the camera array in the subsequent synthesis of super-resolution images. In this way, information concerning defects can be utilized to disregard image data captured by regions of cameras impacted by the defects during the synthesis of super-resolution images. Processes for synthesizing super-resolution images in this manner are discussed further below. In the event that at least one of the defect counts with respect to a specific set of regions exceeds the predetermined threshold, then the camera array is determined to be defective for the purpose of synthesizing super-resolution images having acceptable image quality.

Although specific process for determining whether a camera array is defective are described above with respect to FIG. 6, any of a variety of processes can be utilized in accordance with embodiments of the invention including processes that define sets of regions based upon any of a variety of criterion appropriate to a specific application including sets that evaluate the reliability of image data used to synthesize other types of images including (but not limited to) stereo pairs of super-resolution images, sequences of images synthesized from sub-arrays of cameras within of the camera array, and/or high speed video sequences including successive frames synthesized from different sub-arrays of cameras within the camera array. As can be readily appreciated in view of the above discussion, the specific regions included within the specific sets of regions can be determined based upon the cameras used to synthesize each type of image and using epipolar lines and maximum parallax shift bounds to identify the regions in those cameras that fall within parallax uncertainty zones. Processes for identifying defects in accordance with embodiments of the invention are discussed further below.

Identifying Defective Regions Based Upon Pixel Defects

A region of a camera can be considered defective due the presence of defective pixels within the region. Pixels can be considered defective for reasons including (but not limited to) the pixels being determined to be hot pixels, bright pixels, or dark pixels. Any of a variety of criteria appropriate to the requirements of specific applications can be utilized to determine whether the presence of defective pixels within a region renders the entire region defective for the purpose of evaluating the camera array. In a number of embodiments, the presence of a predetermined number of pixels results in the entire region being considered defective. In several embodiments, the presence of a cluster of defective pixels exceeding a predetermined size within region results in the entire region being considered defective. In certain embodiments, clusters of pixels that are equal to or smaller than a 2×2 cluster of pixels can be tolerated. However, a cluster of pixels that includes three or more pixels in one dimension results in the entire region being considered defective. In other embodiments, the size of defective pixel clusters that can be tolerated is determined based upon the requirements of specific applications.

Figure 7:
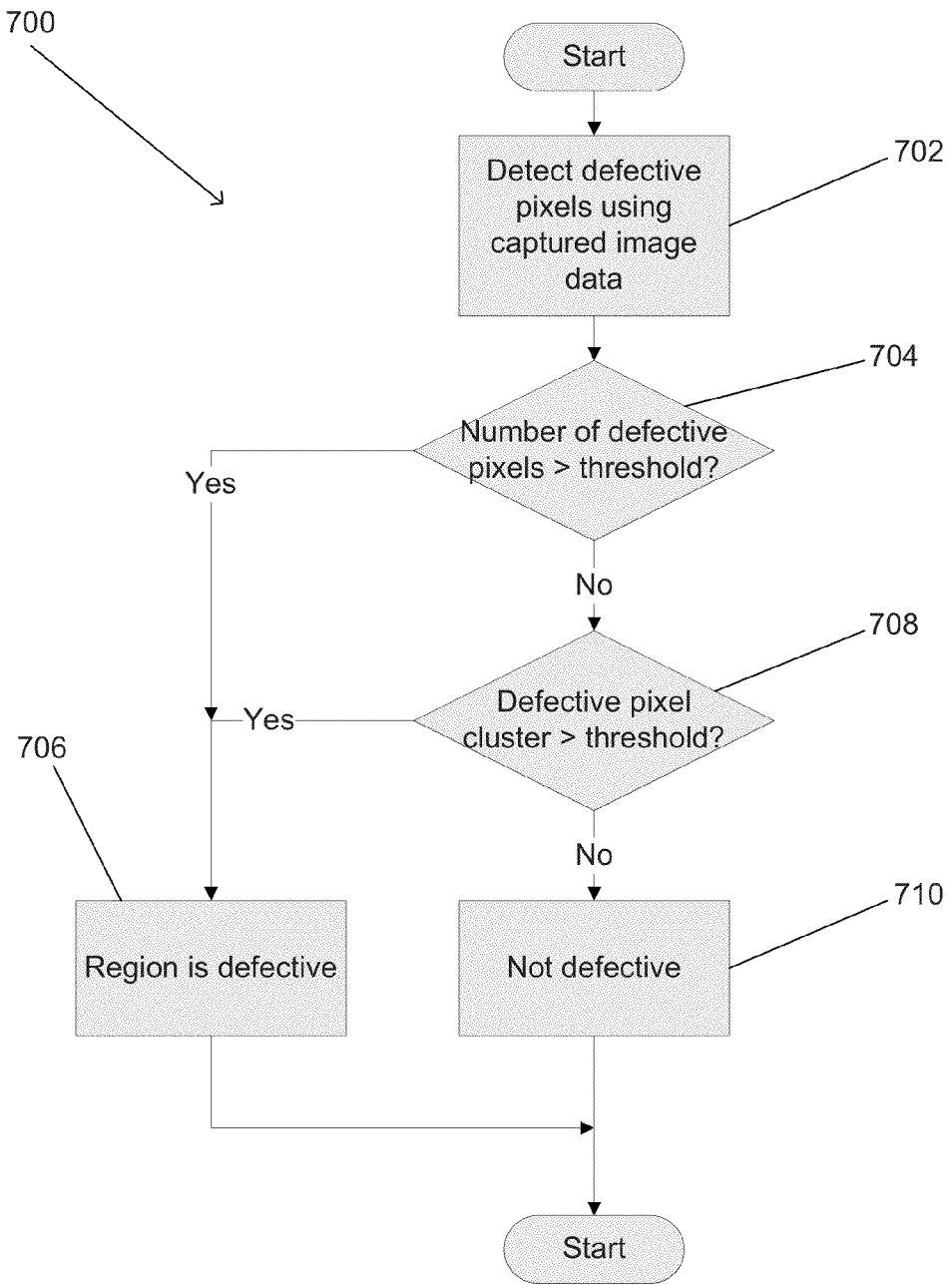
FIG. 7 is a process for determining whether a region of a camera is defective based upon the presence of defective pixels within the region of the camera in accordance with an embodiment of the invention.

A process for determining whether the presence of defective pixels results in a region being considered defective for the purpose of evaluating the performance of a camera array in accordance with an embodiment of the invention is illustrated in FIG. 7. The process 700 includes detecting (702) defective pixels using image data captured within a specific region. A determination (704) is made concerning whether the number of defective pixels exceeds a threshold. If the threshold is exceeded, then the region is considered to be defective (706) for the purpose of evaluating the camera array. In the event that the number of defective pixels does not exceed the predetermined threshold, a separate determination (708) is made concerning whether the size of any clusters of defective pixels exceeds a predetermine threshold. In the event that one or more clusters are present that the exceed the maximum size criterion, then the region is considered to be defective (706) for the purpose of evaluating the camera array. Otherwise the region is treated (710) as not being defective despite the presence of defective pixels. In many embodiments, information concerning the defective pixels is stored for use when synthesizing images using image data captured by the region so that the image data captured by the defective pixels can be disregarded.

Although specific processes for determining whether a region of a camera is defective based upon the characteristics of defective pixels present within the region of the camera are described above, any of a variety of processes utilizing any of a variety of criteria appropriate to the requirements of specific applications can be utilized to determine whether a region of a camera is defective for the purpose of evaluating a camera array based upon the number, type, and/or location of defective pixels within the region in accordance with embodiments of the invention. Processes for evaluating whether a region of a camera is defective utilizing MTF measurements in accordance with embodiments of the invention are discussed below.

Identifying Defective Regions Using MTF Measurements

Defects in the optics of a camera can be identified by performing MTF measurements. In several embodiments, defects in regions of a camera that are attributable to defects in the lens stack of the camera can be detected by performing an MTF measurement for the region. Where the MTF measurement diverges from the anticipated MTF of the optics, then MTF failure can be considered to have occurred within the region and the region can be treated as defective for the purpose of evaluating the overall reliability of the camera array.

Figure 8:
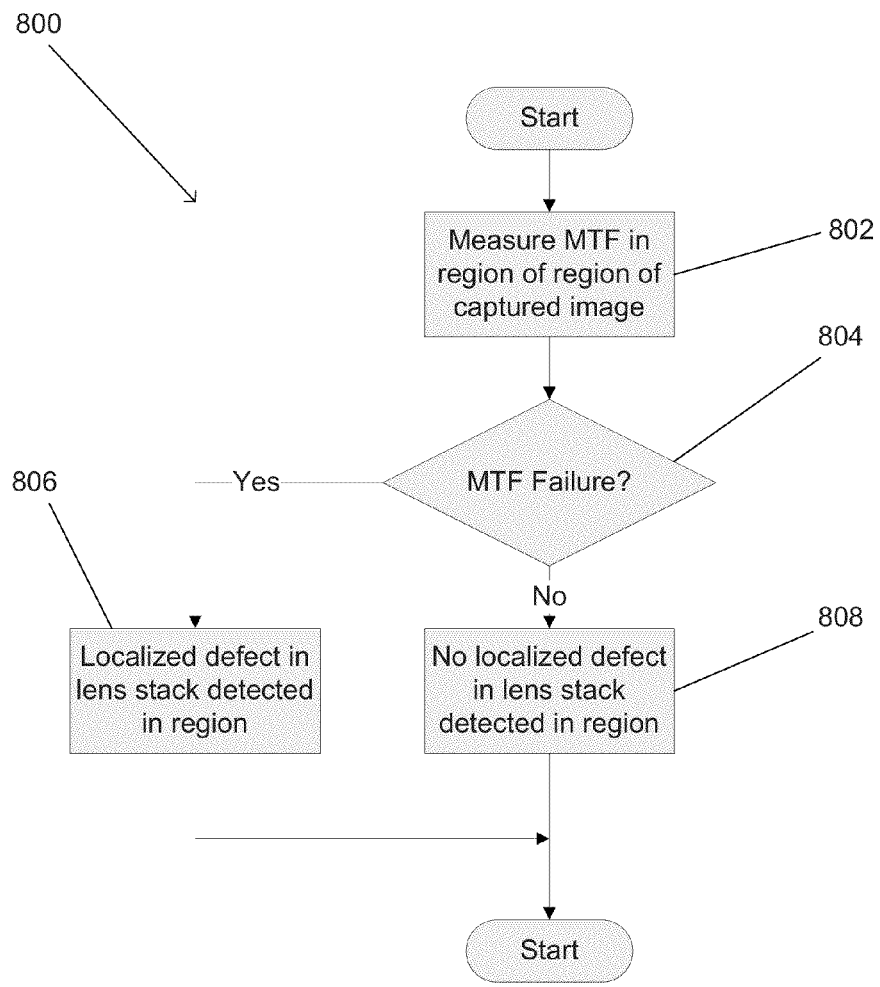
FIG. 8 is a process for determining whether a region of a camera is defective based upon measurements of the MTF of the camera in the region in accordance with an embodiment of the invention.

A process for determining whether a region of a camera is defective when evaluating the overall reliability of a camera array in accordance with an embodiment of the invention is illustrated in FIG. 8. The process 800 includes measuring (802) the MTF of a region of an image captured by the camera. When a determination (804) is made that the MTF measurement indicates that the MTF within the region falls below a predetermined threshold. In many embodiments, when an MTF measurement with respect to a region does not meet a threshold for a certain contrast at a certain spatial frequency, the region of the camera is determined to be defective for the purpose of evaluating the overall performance of the camera array. In the event that the MTF measurement for the region satisfies the predetermined acceptance criterion, then the region is determined (808) not to be defective for the purpose of evaluating the overall performance of the camera array.

Although specific processes are described above with reference to FIG. 8, any of a variety of processes can be utilized to screen regions of cameras based upon the characteristics of the optics of a camera as appropriate to the requirements of specific applications in accordance with embodiments of the invention.

Processes for Selecting a Reference Camera

In many embodiments, the process of synthesizing a super-resolution image involves selection of a reference camera and synthesizing the super-resolution image from the viewpoint of the reference camera. The camera selected as the reference camera plays an important role in the synthesis of the super-resolution image. Therefore, processes in accordance with a number of embodiments of the invention attempt to select a reference camera that is free from defects and will discard a camera array when none of the cameras that can serve as a reference camera are free of defects.

Figure 9:
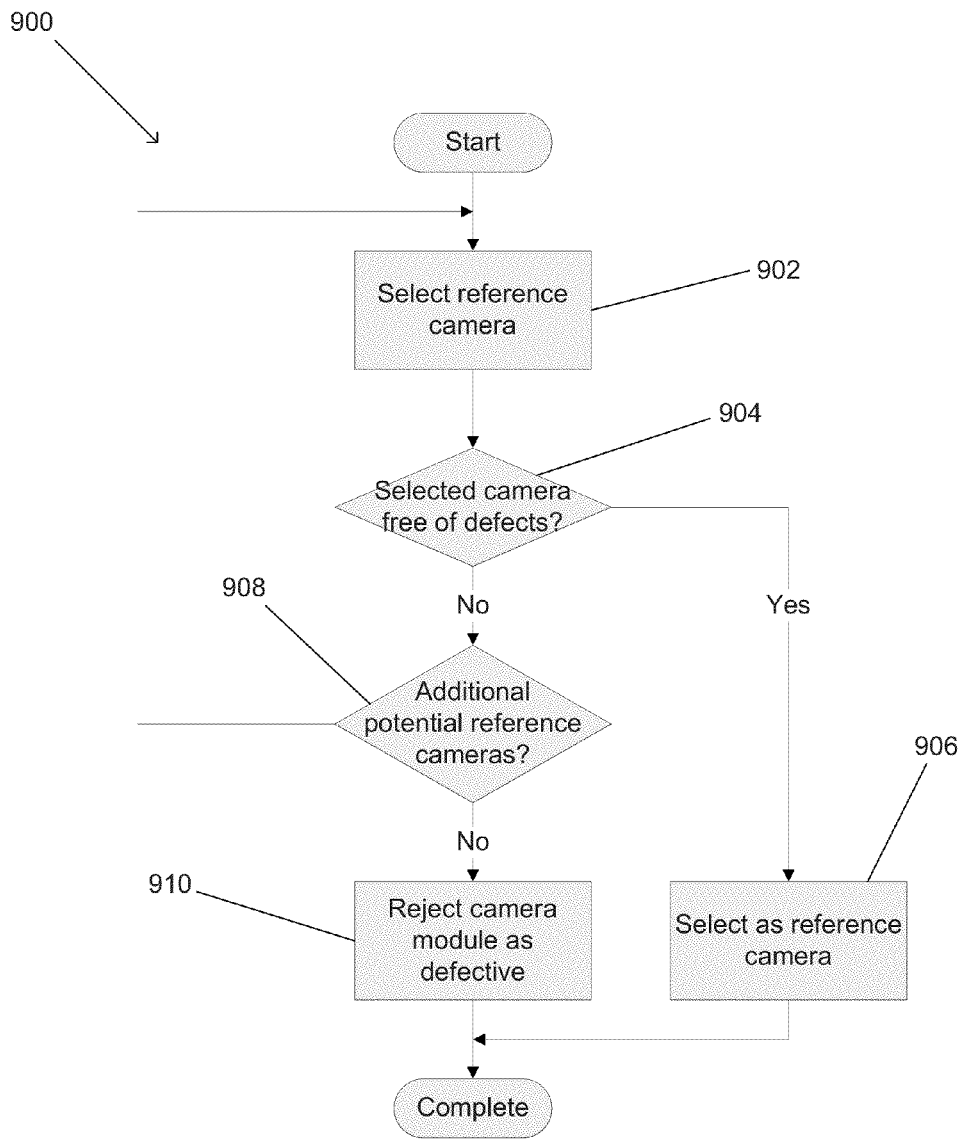
FIG. 9 is a process for selecting a reference camera within a camera array based upon the reference camera being free from defective regions in accordance with an embodiment of the invention.

A process for selecting a reference camera in a camera array in accordance with an embodiment of the invention is illustrated in FIG. 9. The process 900 includes selecting (902) an initial reference camera. A determination (904) is made concerning whether the selected camera is free from defects. In the event that the selected camera is free of defects, then the camera is selected (906) as the reference camera. In the event that the selected camera incorporates one or more defective regions, then the process of selecting (902) candidate reference cameras and evaluating (904) the candidate reference cameras repeats until either a candidate reference camera is found that is free from defects and selected (906) as the reference camera or all potential candidates are exhausted. In which case, the camera array is rejected (910) as defective. Depending upon the construction of the camera array and the requirements of a specific application, there is typically only a subset of cameras in the camera array that can serve as a reference camera.

Although specific processes for selecting a reference camera are discussed above with reference to FIG. 9, any of a variety of processes appropriate to the requirements of specific applications can be utilized in accordance with an embodiment of the invention.

Screening Optic Arrays

While much of the discussion above has focused on systems and methods for screening camera arrays for defects that will prevent the synthesis of images having acceptable image quality, similar techniques can be utilized to screen optic arrays manufactured for use in array camera modules in accordance with embodiments of the invention. The MTF in multiple regions of each of the lens stacks in an optic array can be measured using an optical test instrument designed to perform MTF testing, such as (but no limited to) the Image Master® PRO line of products manufactured by Trioptocis GmbH of Wedel, Germany. Furthermore, scripts can be executed on such optical test instruments to detect defective optic arrays using processes that consider the impact that defective regions within the optical array would have on images synthesized using image data captured by a hypothetical array cameras that incorporated the optic array in accordance with embodiments of the invention. Defects in a lens stack can be localized by separately measuring the MTF of each of a number of regions of each lens stack. Parallax uncertainty zones can be defined with respect to the regions of the lens stacks in the optic array in the same way in which they are defined for regions of cameras in a camera array. By counting regions in the parallax uncertainty zones that have MTF measurements that fail to satisfy one or more predetermined MTF criterion, a determination can be made concerning whether the defects in the optics are likely to result in the construction of an array camera module that is incapable of capturing image data from which super-resolution images can be synthesized with acceptable image quality. As with camera arrays, the specific set of regions that forms each parallax uncertainty zone can be stored in a lookup table (or similar data structure) enable rapid retrieval. In this way, counts can be generated and the appropriate threshold applied with respect to each set to determine whether the optic array is defective.

Figure 10:
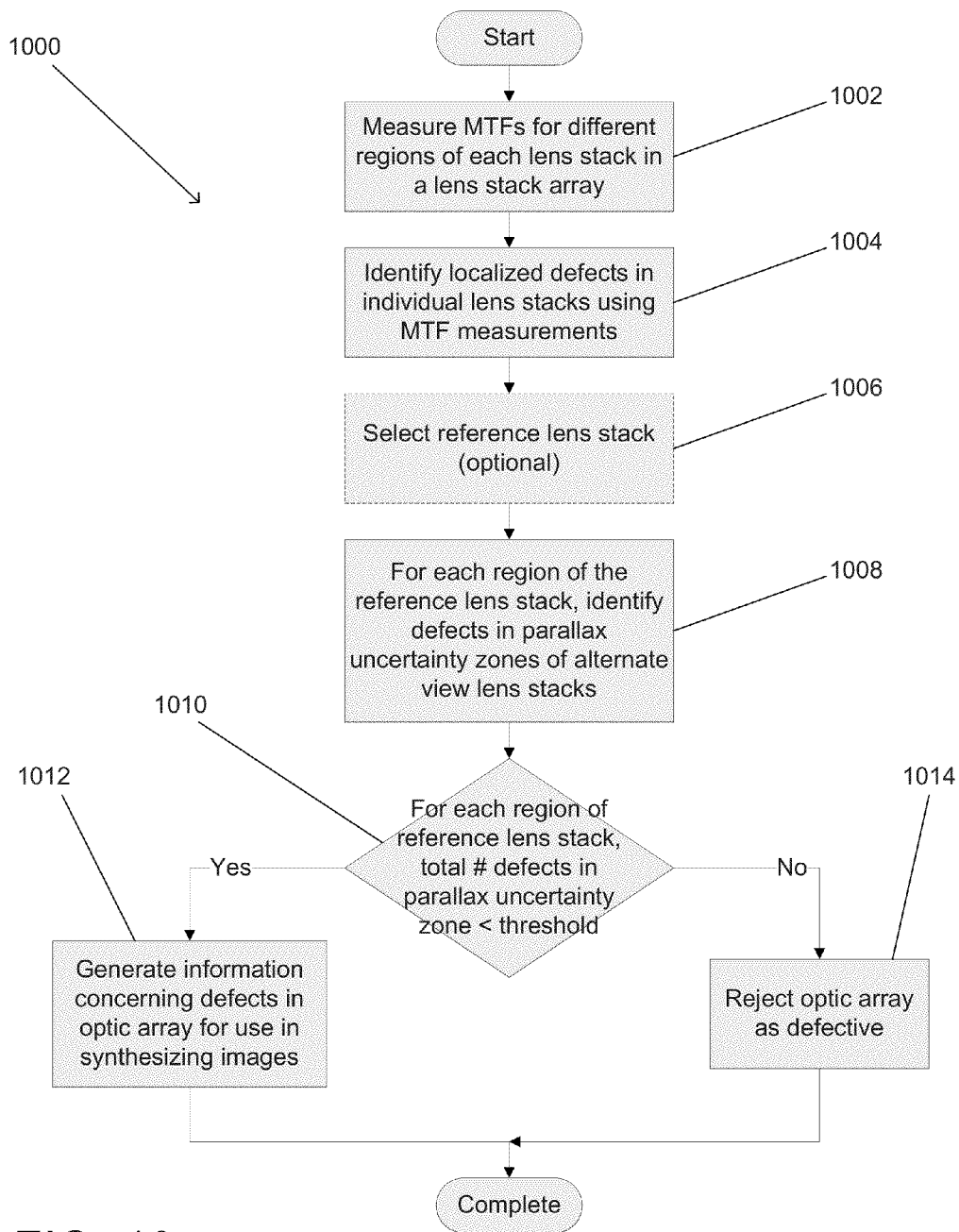
FIG. 10 is a process for determining whether an optic array is defective based upon the presence of localized regions of MTF that do not pass an acceptance criterion in predetermined parallax uncertainty zones in accordance with an embodiment of the invention.

A process for determining whether a lens array is defective in accordance with an embodiment of the invention is illustrated in FIG. 10. The process 1000 includes measuring (1002) MTFs for different regions of each lens stack in the lens stack array. Localized defects can be identified (1004) by comparing the MTF measurements to at least one predetermined criterion such as (but not limited to) any of the following thresholds: on-axis MTF at 227 lp/mm>0.3; all regions at 0.6 relative field height having S-MTF at 227 lp/mm>0.2, and T-MTF at 227 lp/mm>0.2; all regions @ 0.8 relative field height having S-MTF at 227 lp/mm>0.15, and T-MTF at 227 lp/mm>0.1. In other embodiments, any thresholds appropriate to the requirements of specific applications can be utilized. In a number of embodiments, a lens stack is selected as a reference lens stack. As is discussed above, several embodiments of the invention require that a reference camera be free from defects. Accordingly, a lens stack selected as a reference lens stack can also be subject to a requirement that it be free from defects. In the event no lens stack that can serve as the lens stack of a reference camera is free from defects, then certain embodiments of the invention involve rejecting the lens stack as defective.

The process of screening the optic array can then involve identifying (1008) defects that will impact image data captured within parallax uncertainty zones of each region of a super-resolution image that can be synthesized from the viewpoint of the reference lens stack. As noted above, this can involve utilizing look up tables (or similar rapidly accessible data structures) to count the number of defects that occur in specific sets of regions corresponding to the parallax uncertainty zones (in each color channel) for each region of the reference lens stack. The number of defects in each of the specific sets of regions can then be evaluated to determine (1010) whether the number exceeds a predetermined threshold. In many embodiments, different thresholds can be defined for different sets. In several embodiments, different thresholds apply to the sets in each of the different color channels that will ultimately be formed using the optic array. In embodiments where the number of defects in each instance is sufficiently low to satisfy the thresholds, then the optic array is determined to be suitable for use in the construction of an array camera module. Furthermore, information concerning defects captured during the screening process can be subsequently utilized to disregard image data captured by regions of cameras impacted by the defects in the optic array during the synthesis of super-resolution images. Processes for synthesizing super-resolution images in this manner are discussed further below. In the event that at least one of the defect counts with respect to a specific set of regions exceeds the predetermined threshold, then the optic array is determined to be defective for the purpose of constructing an array camera module.

Although specific processes for determining whether an optic array is defective are described above with respect to FIG. 10, any of a variety of processes can be utilized in accordance with embodiments of the invention including processes that define sets of regions based upon any of a variety of criterion appropriate to a specific application including sets that evaluate the reliability of optic arrays based upon synthesizing other types of images including (but not limited to) stereo pairs of super-resolution images, sequences of images synthesized from sub-arrays of cameras within of the camera array, and/or high speed video sequences including successive frames synthesized from different sub-arrays of cameras within the camera array. Furthermore, material binning can be utilized to further improve yield by combining optic arrays and sensors based upon the defects present in each component. In this way, combinations can be created that match regions in which localized defects are present in an optic array with localized defects in a sensor to minimize the total number of camera regions that contain localized defects in an array camera module assembled using the optic array and the sensor.

Synthesizing Images Using Camera Arrays Incorporating Defects

Camera arrays that are screened utilizing processes similar to those outlined above and/or that include optic arrays and/or sensors that are screened utilizing processes similar to those outlined above can contain defects. When image data captured by pixels impacted by the defects is utilized to synthesize an image, then a degradation in image quality can result. The process of screening the camera array and/or the optics yields information concerning regions in the cameras and/or lens stacks or sensors containing defects. In several embodiments of the invention, information concerning the defective regions is maintained by the camera array and utilized in the processing of captured image data to synthesize images. In several embodiments, image data captured in a defective region can be disregarded. Where a region is identified as defective, but the location of the specific pixels impacted by the defect is known, only the impacted pixels can be disregarded.

Figure 11:
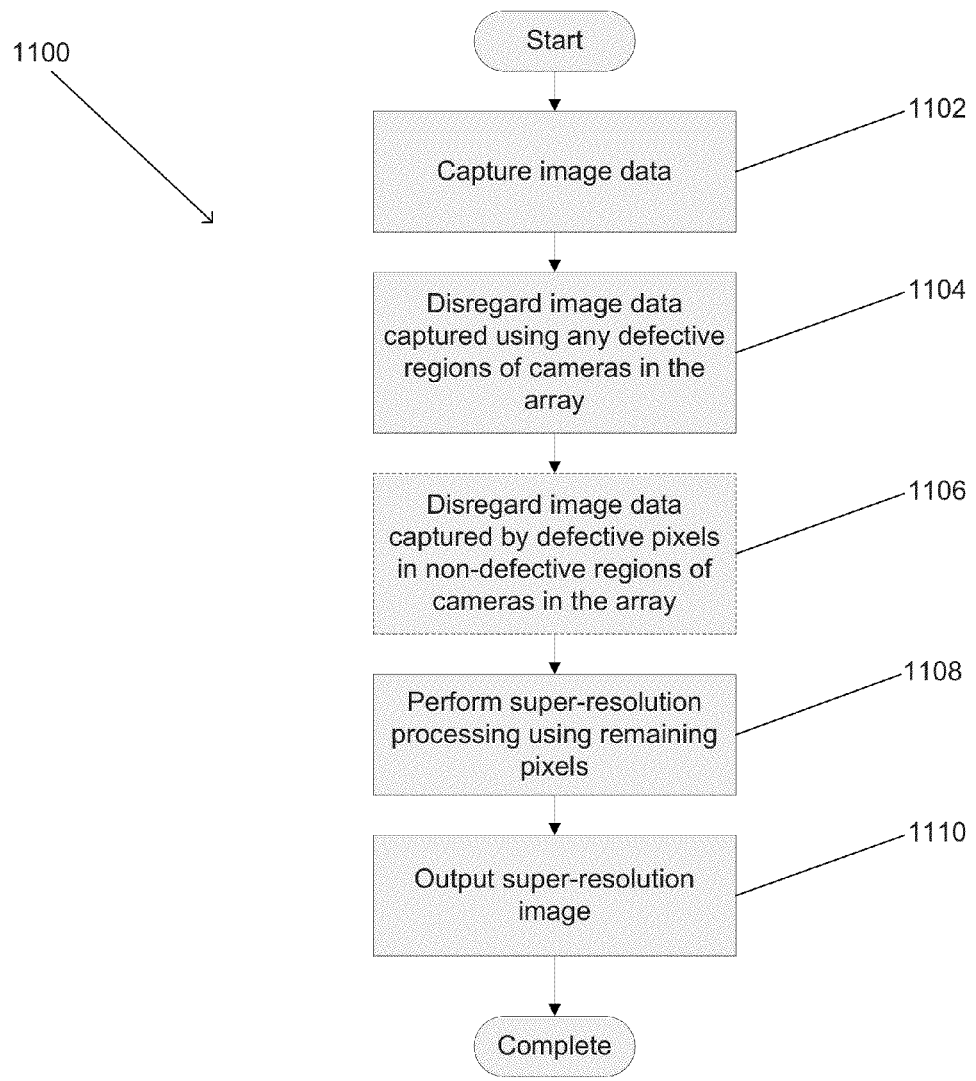
FIG. 11 is a process for synthesizing a super-resolution image from image data captured by a camera array including defects using information concerning the location of the defective regions to disregard captured image data that are impacted by the defects in accordance with an embodiment of the invention.

A process for synthesizing a super-resolution image that involves disregarding image data captured by regions and/or pixels impacted by defects in accordance with an embodiment of the invention is illustrated in FIG. 11. The process 1100 includes capturing (1102) image data using the cameras in the camera array. Information concerning defective regions in specific cameras and or lens stacks, which can take the form of arbitrary formatted defect data, can be utilized to disregard (1104) image data captured by pixels in the impacted regions of the identified cameras. It is worth noting that when an entire region is disregarded, even the pixels within the region that are not impacted by the defect are disregarded. In many embodiments, the defect data can also contain information concerning defective pixels can also be disregarded (1106). A super-resolution process can be applied (1108) to the remaining image data and yield a super-resolution image (1110) as an output.

Although specific processes for synthesizing super-resolution images are discussed above with respect to FIG. 11, any of a variety of processes for synthesizing images from image data captured by camera arrays that utilize information concerning regions of specific cameras within the camera array that contain defects can be utilized in accordance with embodiments of the invention including (but not limited to) processes that involve synthesizing stereo pairs of super-resolution images, sequences of images synthesized from sub-arrays of cameras within of the camera array, and/or high speed video sequences including successive frames synthesized from different sub-arrays of cameras within the camera array.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for detecting a defective camera array using an image processing system, where the camera array comprises a plurality of cameras, the method comprising:

capturing image data of a known target using the plurality of cameras, where the image data forms a plurality of images;

dividing each of the plurality of images into a plurality of corresponding image regions using the image processing system;

identifying the presence of at least one localized defect in at least one of the plurality of the cameras by evaluating the image regions in the plurality of images in accordance with at least one predetermined localized defect criterion using the image processing system;

detecting a defective camera array using the image processing system when the number of localized defects in a specific set of image regions exceeds a predetermined threshold, where the specific set of image regions is formed by:
  a common corresponding image region from at least a subset of the plurality of images; and
  any additional image region in a given image that contains at least one pixel located within a predetermined maximum parallax shift distance along an epipolar line from a pixel within said common corresponding image region within the given image, where the epipolar line is defined by the relative location of the center of the camera that captured the given image and a predetermined viewpoint.

2. The method of claim 1, wherein identifying the presence of at least one localized defect in at least one of the plurality of the cameras by evaluating the image regions in the plurality of images in accordance with at least one predetermined localized defect criterion using the image processing system comprises identifying a plurality of defective pixels within an image region that satisfies at least one predetermined criterion.

3. The method of claim 2, wherein the predetermined criterion is that the plurality of defective pixels within the image region exceeds a predetermined number of defective pixels.

4. The method of claim 2, wherein the predetermined criterion is that the plurality of defective pixels includes a cluster of defective pixels that exceeds a predetermine size.

5. The method of claim 2, wherein defective pixels comprise hot pixels, bright pixels and dark pixels.

6. The method of claim 1, wherein identifying the presence of at least one localized defect in at least one of the plurality of the cameras by evaluating the image regions in the plurality of images in accordance with at least one predetermined localized defect criterion using the image processing system comprises:
  measuring the Modulation Transfer Function (MTF) within an image region; and
  determining that the MTF of the image region fails to satisfy a predetermined criterion.

7. The method of claim 6, wherein the predetermined criterion is that the on-axis MTF at a predetermined spatial frequency exceeds a first predetermined threshold, the off-axis tangential MTF at a predetermined spatial frequency exceeds a second predetermined threshold, and the off-axis sagittal MTF at a predetermined spatial frequency exceeds a third predetermined threshold.

8. The method of claim 1, wherein said plurality of corresponding images portions forms a first plurality of corresponding image regions and the method further comprises:
  dividing each of the plurality of images into a second plurality of corresponding image regions using the image processing system, where the number of image regions in the first plurality of corresponding image regions differs from the number of image regions in the second plurality of corresponding image regions; and
  identifying the presence of at least one localized defect in at least one of the plurality of the cameras by evaluating the image regions in the second plurality of images in accordance with at least one additional predetermined localized defect criterion using the image processing system.

9. The method of claim 1, wherein:
the plurality of images forms a reference image and a plurality of alternate view images;
  the specific set of image regions is formed by:
    a specific image region from the reference image;
    the image regions from each of the alternate view images that correspond to the specific image region from the reference image; and
    any additional image region in a given alternate view image from the plurality of alternate view images that contains at least one pixel located within a predetermined maximum parallax shift distance along an epipolar line from a pixel within the image region of the given alternate view image that corresponds to the selected image region from the reference image, where the epipolar line is defined by the relative location of the center of the camera that captured the reference image and the center of the camera that captured the given alternate view image.

10. The method of claim 1, wherein:
the plurality of images forms a plurality of images in each of a plurality of color channels; and
a specific set of image regions is formed by image regions from the plurality of images within one of the plurality of color channels.

11. The method of claim 10, wherein:
the plurality of images forms a reference image and a plurality of alternate view images and said plurality of images from one of the plurality of color channels does not include the reference image; and
the specific set of image regions is further formed by:
  the image regions from each of the alternate view images within said one of the plurality of color channels that correspond to a specific image region from the reference image; and
  any additional image region in a given alternate view image from said one of the plurality of color channels that contains at least one pixel located within a predetermined maximum parallax shift distance along an epipolar line from a pixel within the image region of the given alternate view image that corresponds to the selected image region from the reference image, where the epipolar line is defined by the relative location of the center of the camera that captured the reference image and the center of the camera that captured the given alternate view image.

12. The method of claim 10, further comprising detecting a defective camera array using the image processing system when the number of localized defects in a second set of image regions exceeds a second predetermined threshold, where the second set of image regions is formed by image regions from the plurality of images within a second of the plurality of color channels.

13. The method of claim 12, wherein said predetermined criterion used with respect to said specific set of image regions from said one of the plurality of color channels is different from said second predetermined criterion used with respect to said second set of image regions from said second of the plurality of color channels.

14. A method for detecting a defective optic array using an image processing system, where the optic array comprises a plurality of lens stacks, the method comprising:
  dividing the image field of each of the plurality of lens stacks into a plurality of corresponding regions when using an optical test instrument;
  measuring the Modulation Transfer Function (MTF) of a known target using the optical test instrument in each of the regions;
  identifying the presence of at least one localized defect in at least one of the plurality of the lens stacks by evaluating the MTF measurements of the regions in the plurality of lens stacks in accordance with at least one predetermined localized defect criterion using the optical test instrument;

detecting a defective optic array using the image processing system when the number of localized defects in a specific set of regions exceeds a predetermined threshold, where the specific set of regions is formed by:

a common corresponding region from at least a subset of the plurality of lens stacks; and any additional region in a given lens stack that forms an image within a predetermined maximum parallax shift distance along an epipolar line from said common corresponding region within the given lens stack, where the epipolar line is defined by the relative location of the center of the given lens stack and a predetermined viewpoint.

* * * * *